United States Patent [19]

Motley et al.

[11] 4,061,978
[45] Dec. 6, 1977

[54] TIMING RECOVERY FOR AN AUTOMATICALLY EQUALIZED DATA MODEM

[75] Inventors: David M. Motley, Santa Ana; Naif D. Salman, Orange; King Y. Cheng, Tustin, all of Calif.

[73] Assignee: Hycom Incorporated, Irvine, Calif.

[21] Appl. No.: 710,655

[22] Filed: Aug. 2, 1976

Related U.S. Application Data

[63] Continuation of Ser. No. 505,052, Sept. 11, 1974, abandoned.

[51] Int. Cl.² .................. H04B 1/10; H04B 3/04; H04L 7/00
[52] U.S. Cl. .................. 325/324; 178/69.1; 325/42; 333/18
[58] Field of Search .................. 325/42, 323, 324; 333/18; 178/69.1, 88

[56] References Cited

U.S. PATENT DOCUMENTS

| 3,694,752 | 9/1972 | Gibson | 325/42 |
| 3,868,603 | 2/1975 | Guidoux | 325/42 |

Primary Examiner—Robert L. Griffin
Assistant Examiner—Marc E. Bookbinder
Attorney, Agent, or Firm—Gordon L. Peterson

[57] ABSTRACT

In a receiver, an analog-to-digital converter is adapted to sample a distorted analog signal to provide a plurality of distorted digital symbols separated in time by a particular interval. In an equalizer, taps are provided with variable multiplying coefficients which sequentially multiply the distorted digital symbols to provide undistorted digital symbols. A timing control network is responsive to variation in one of the multiplying coefficients to control the timing of the converter and hence the duration of the particular interval.

11 Claims, 13 Drawing Figures

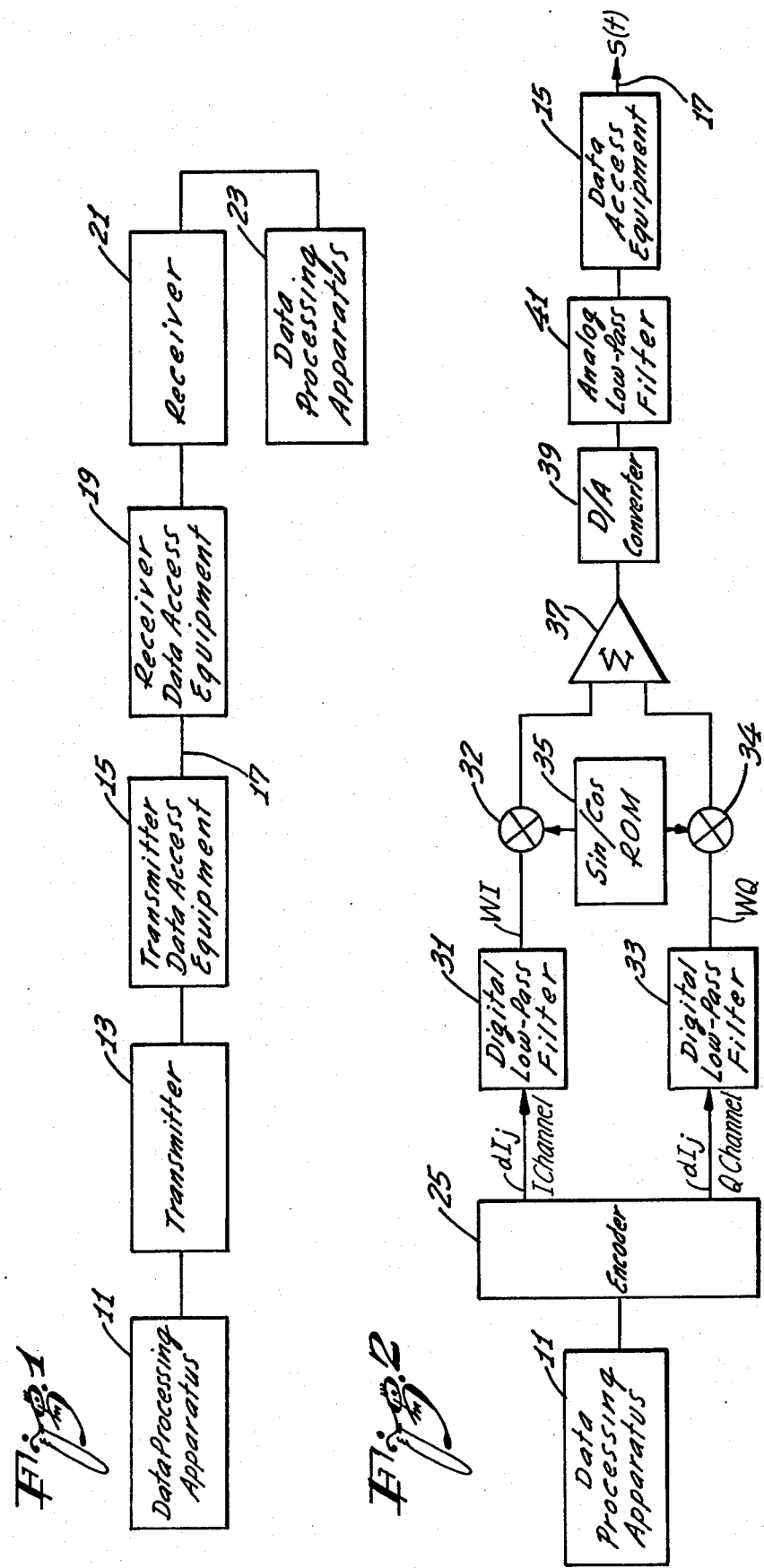

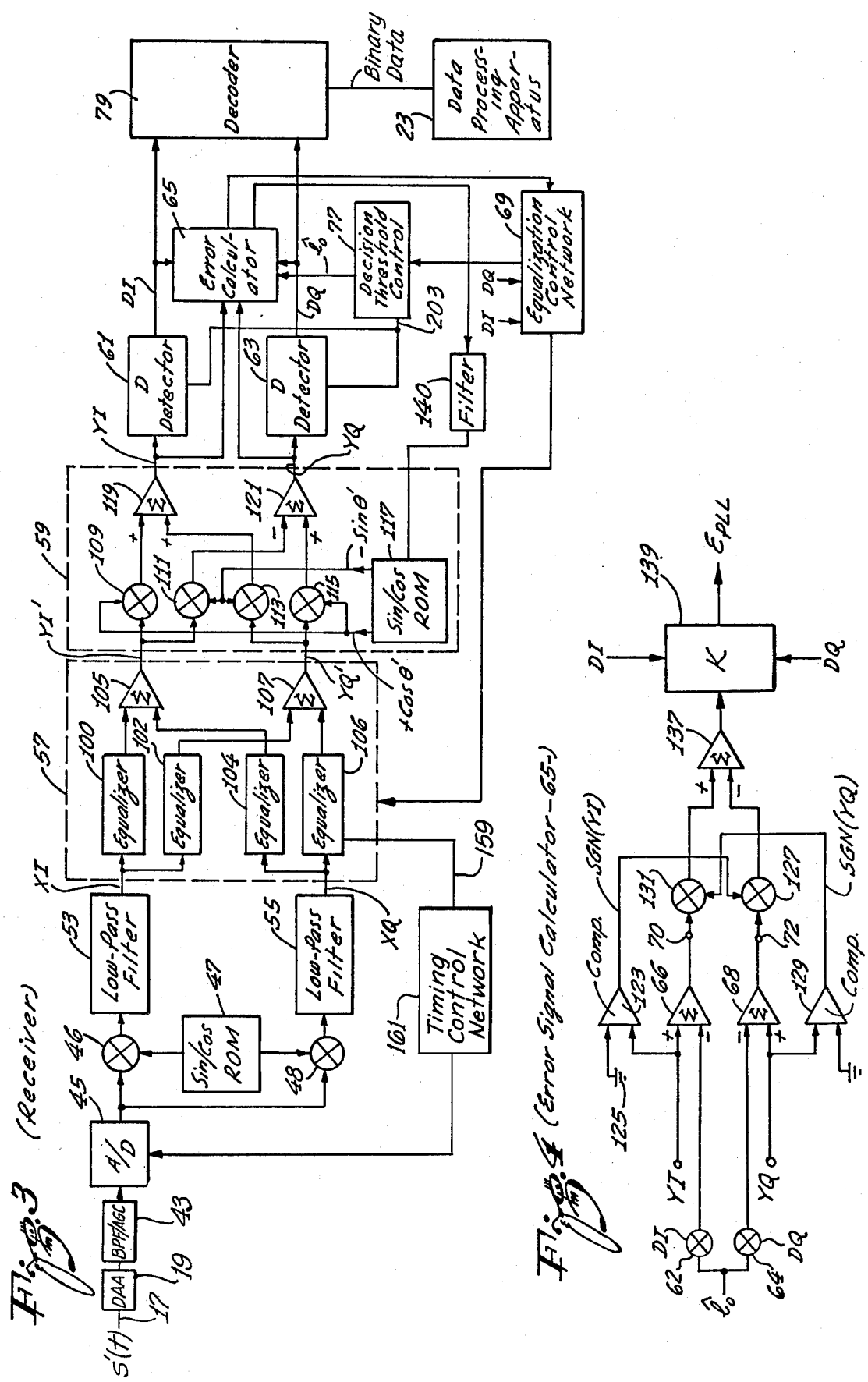

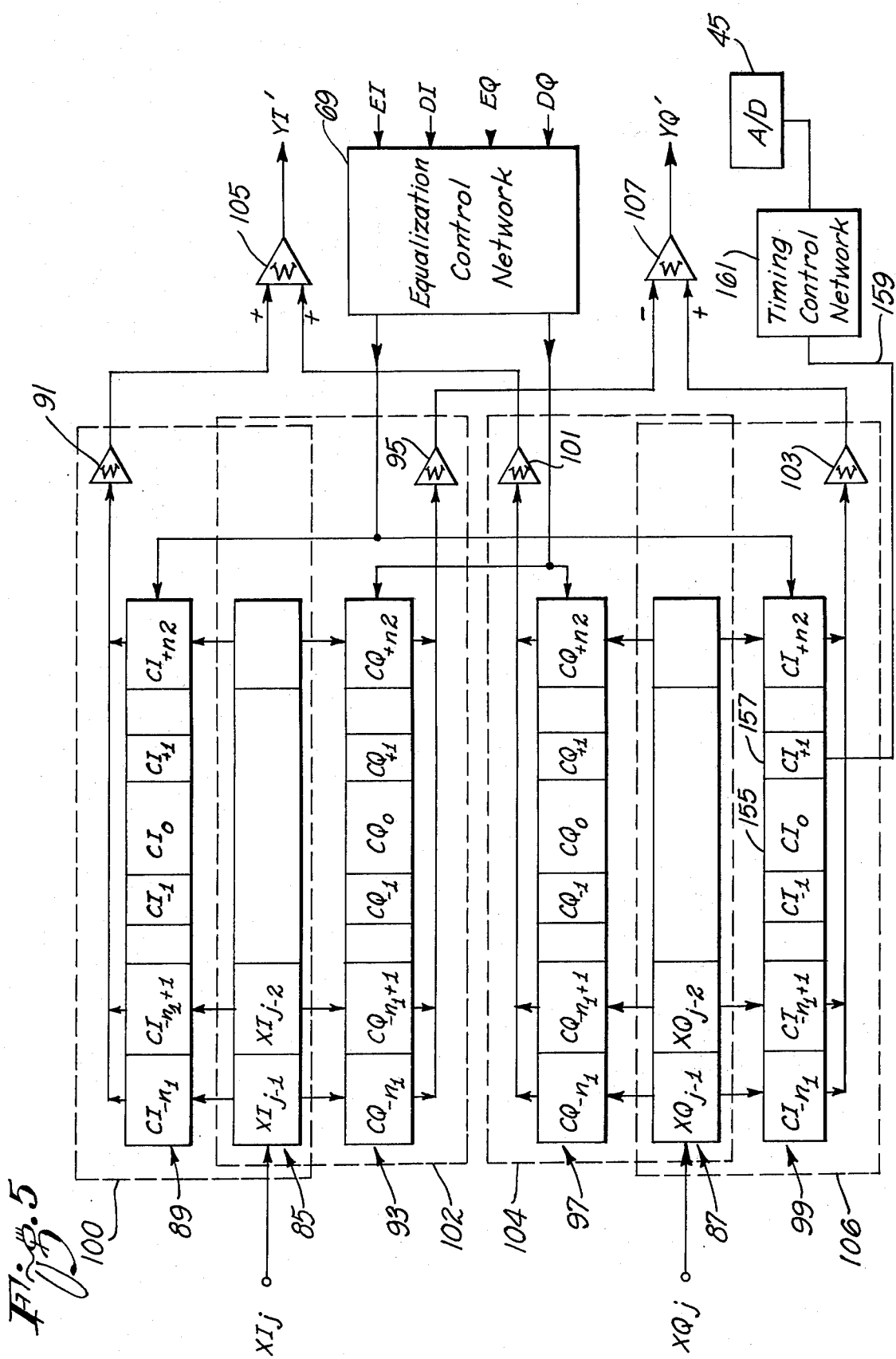

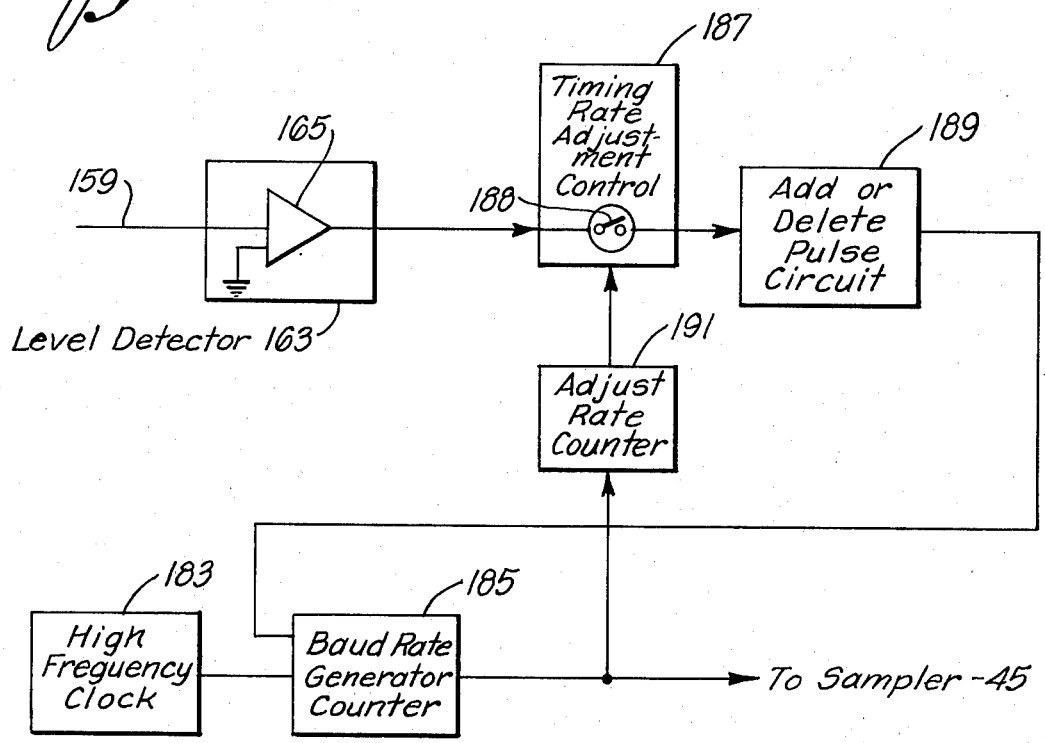
Fig. 6 (Timing Control Network -161-)
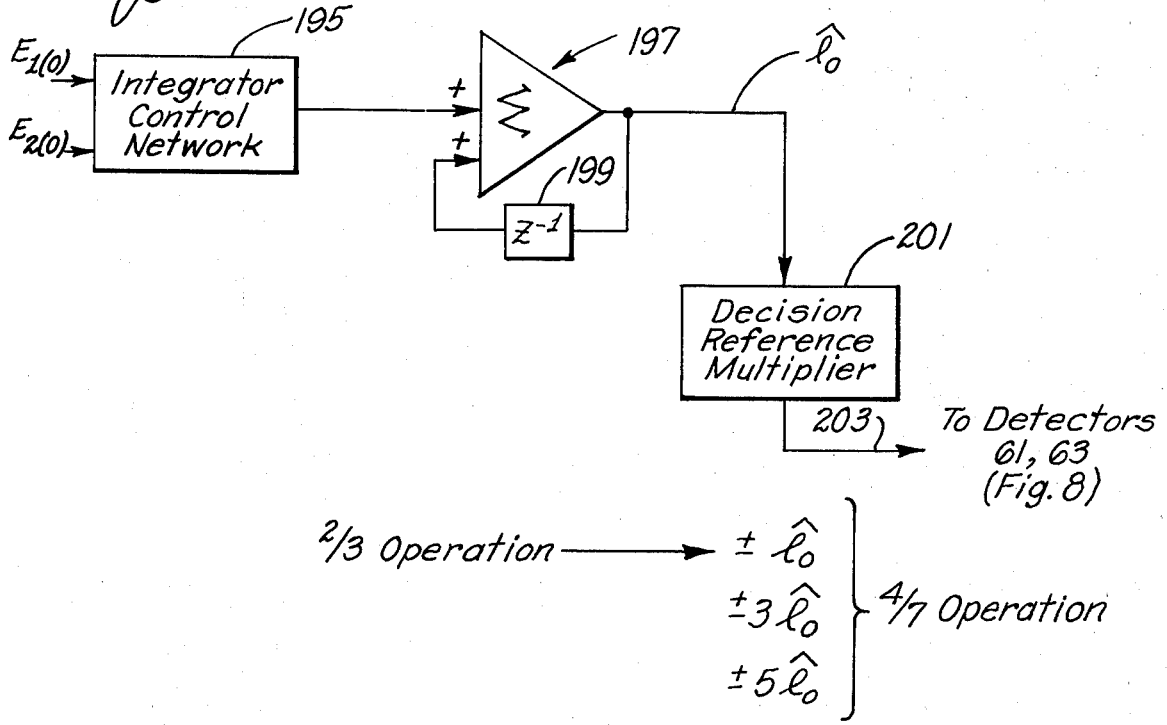
Fig. 9 (Decision Threshold Control - 77-)

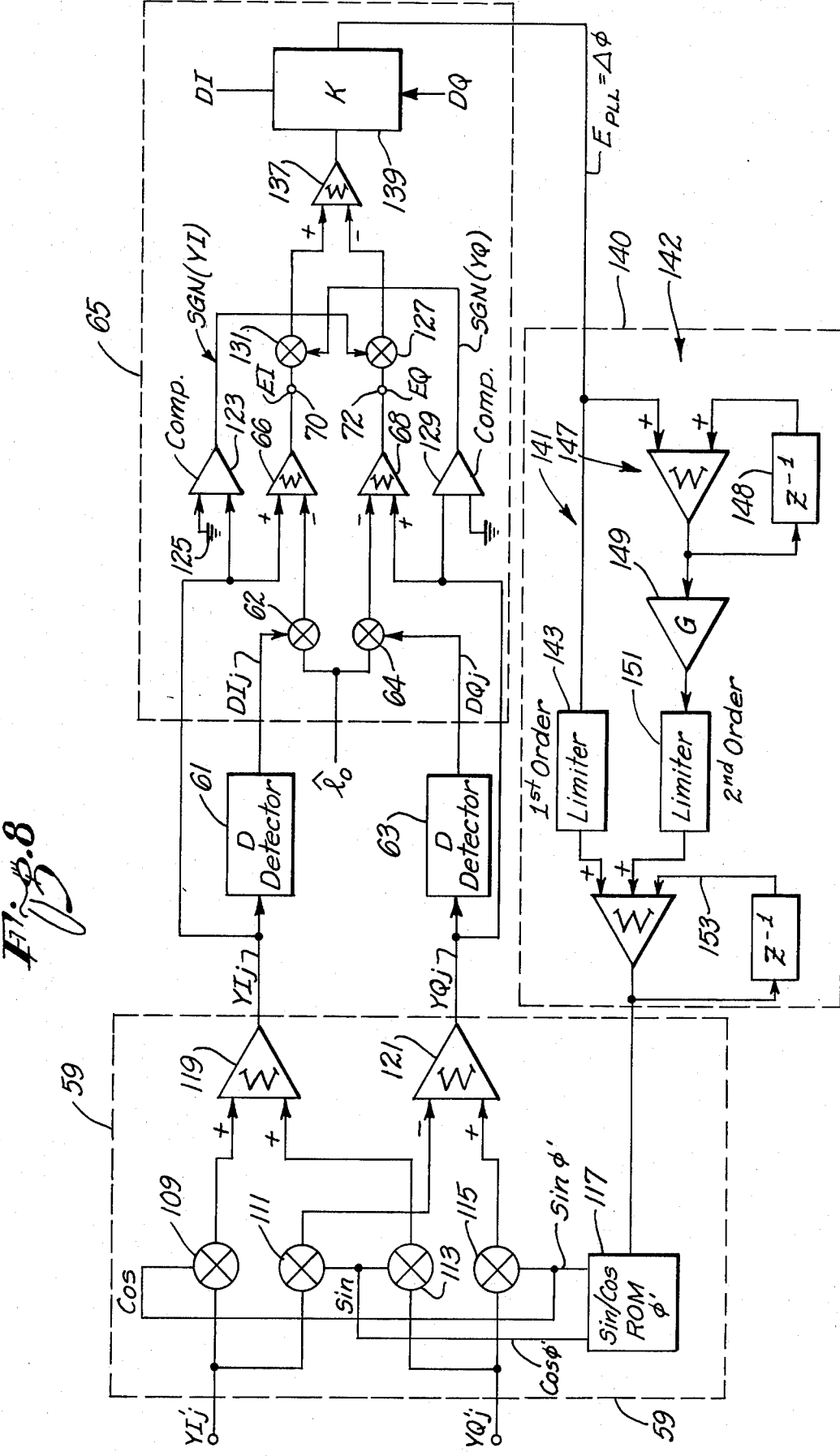

TIMING RECOVERY FOR AN AUTOMATICALLY EQUALIZED DATA MODEM

This is a continuation of application Ser. No. 505,052 filed Sept. 11, 1974, for TIMING RECOVERY FOR AN AUTOMATICALLY EQUALIZED DATA MODEM, now abandoned.

BACKGROUND OF THE INVENTION

1. Field of the Invention

This invention relates generally to modems, and more specifically to a timing network responsive to equalization multiplying coefficients to recover and control the timing of an automatic digital modem.

2. Description of the Prior Art

With the advent of large scale data processing systems, it has become increasingly desirable to transmit digital data over long distances with a high degree of accuracy. For example, a chain of retail stores might have a central warehouse facility with which each of the stores might advantageously communicate to maintain its respective inventory. A branch bank might also find it desirable to transmit accounting data to a central accounting facility.

Digital modems for transmitting data between first and second data processing apparatuses have included transmitter means for encoding the data received from the first data processing apparatus. An analog signal has been modulated in accordance with the encoded data for transmission typically on a telephone line. At a distant location, a receiver has demodulated the analog signal and decoded the data for introduction to the second data processing apparatus.

In the receiver, the analog signal has been introduced to an analog-to-digital converter or sampler wherein the signal has been sampled at a particular rate and in accordance with variable timing. Sampled values have been coherently demodulated to provide a stream of digital symbols in each of an in-phase channel and a quadrature channel. These channels have each included a lowpass filter providing the receiver with a desired passband. From the lowpass filters, the data symbols have been introduced to an equalization network for correcting any interchannel and intersymbol interference caused by delay and attenuation distortion of the signals resulting from transmission. Following equalization, the signals in the in-phase and quadrature channels have been decoded for introduction to the second data processing apparatus.

Signals at the outputs of the lowpass filters in the in-phase and quadrature channels have expressed positive and negative integer values which have been related to the data. Since the symbols have expressed integer values on opposite sides of a zero level, an eye pattern has been formed with a plurality of level crossings. It has been desirable to time the sampler so that samples are taken at times corresponding to the level crossings. This has provided for detection of symbol levels at a time when the symbols are relatively distinct.

To provide timing for the sampler, a signal has been derived from the eye pattern following the lowpass filter in one of the in-phase and quadrature channels. This signal has provided changes in magnitude at each of the level crossings and these changes have been correlated with the pulses of the modem clock to advance or retard the modem clock and hence the sampling of the sampler.

This timing system has not been particularly effective since the eye pattern at the output of the lowpass filters has been substantially closed by noise related to intersymbol and interchannel interference. As noted, the correction of this type of interference has been accomplished subsequently by the equalization network. Also, the slope of the eye pattern signal at the level crossing has not been particularly great. As a consequence, the magnitude of the timing error signal has not varied substantially with the magnitude of the timing error. Furthermore, considerable circuitry has been used to implement this timing technique. Complex timing algorithms for detecting not only the magnitude but also the slope of the eye pattern signal has relied upon elaborate circuitry to control the timing.

In accordance with the timing techniques of the prior art, a significant number of samples, such as eight, have been used to accurately determine the level crossings of the recovered data signal and hence the timing error. Since only one sample per symbol is needed for normal modem operation, the processing of eight samples per symbol has extended the time necessary to process the demodulated signal and has resulted in a significant increase in the complexity of the implementation circuitry.

Following the lowpass filters, the signals in each of the in-phase and quadrature channels have been introduced to an equalization network. The equalization has included a plurality of multipliers and a plurality of registers each including a plurality of taps. As the symbols have been sequentially introduced to the multipliers, the taps have provided a variable multiplying coefficient to each of the multipliers. The resulting products have been summed to correct for the interchannel and intersymbol interference in the symbols.

These digital modems have also included a phase correction network. This network has corrected for phase and frequency offset as well as phase jitter.

In these digital modems of the prior art, the timing, phase correction, and equalization have each been updated in accordance with error signals which have been independently derived. It is, of course, desirable that all of these functions be updated in accordance with a single error signal in order to minimize the cost and complexity of implementation.

SUMMARY OF THE INVENTION

In the present invention, the timing of the sampler in the receiver is controlled by monitoring the multiplying coefficient of one of the equalizer taps. No special error term, other than that providing for the updating of the equalizer taps, need be generated in order to control the timing of the converter. Furthermore, a particular multiplying coefficient of the equalizer provides a significant indication of timing error which varies considerably with the magnitude of the timing error. No special timing algorithm need be derived so that this particular timing technique can be implemented with a minimum of circuitry.

It was surprising to find that with this new timing technique, the number of samples per signal could be reduced to a minimum number of one, that required for normal modem operation. Furthermore, most of the timing processing circuitry is eliminated since the timing information is obtained not from the received signal but from the tap values of an automatically adjusted tap delay line equalizer.

The multiplying coefficients of the equalizer have known relationships with respect to sample values of an impulse response characteristic of the receiver. Certain of these sample values will have a zero value if the timing of the converter is accurate. If the timing of the sampler is advanced, the sample value may have a positive value whereas if the timing is retarded, the sample value may have a negative value. By monitoring the multiplying coefficients of the equalizer, the value of a particular sample value of the impulse response can be determined and the timing can be corrected accordingly.

A typical impulse response will have a leading edge which slopes gradually from a zero level to a peak. The trailing edge of the peak will have a slope of significant magnitude at the zero level. If the timing is accurate, a sample of the impulse response will be taken at the peak and also at the zero crossing corresponding to the trailing edge of the peak.

A primary tap in the equalizer has a known relationship to the magnitude of the sample corresponding to the peak of the impulse response. A particular tap adjacent to the primary tap has a known relationship with respect to the sample corresponding to the zero crossing on the trailing edge of the impulse response. By monitoring this particular tap, signals of significant magnitude can be provided even when the variations in the timing are slight.

Thus the present timing technique provides a significant indication of timing error and can be easily implemented with much of the circuitry already present in the receiver. Furthermore, the error signal which updates the equalization of the receiver can be used to update the timing of the sampler to minimize the implementation of timing correction.

These and other features and advantages of the present invention will be more apparent with a discussion of the preferred embodiments taken in conjunction with the associated drawings.

DESCRIPTION OF THE DRAWINGS

FIG. 1 is a block diagram of a data transmission system comprising a transmitter and a receiver including one embodiment of the timing correction apparatus of the present invention;

FIG. 2 is a block diagram of the transmitter shown in FIG. 1;

FIG. 3 is a block diagram of the receiver shown in FIG. 1, including an equalization network, a phase lock loop, an error signal calculator, decision threshold control, and an embodiment of the timing control network of the present invention;

FIG. 4 is a block diagram of the error signal calculator shown in FIG. 3;

FIG. 5 is a block diagram of the equalization network and the timing control network shown in FIG. 3;

FIG. 6 is a block diagram of one embodiment of the timing control network of the present invention;

FIG. 8 is a block diagram of the phase lock loop shown in FIG. 3, and

FIG. 9 is a block diagram of the decision threshold control shown in FIG. 3.

DESCRIPTION OF PREFERRED EMBODIMENTS

Figure 7A:
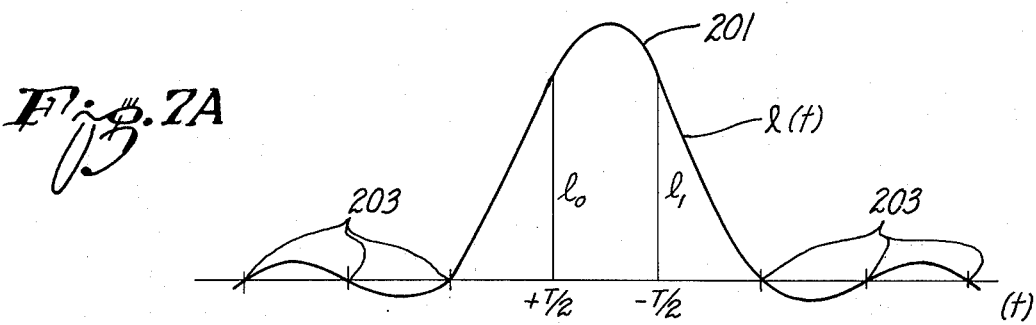
FIG. 7A is a waveform showing the ideal $l(t)$ impulse response characteristic of the receiver.

The present invention concerns digital modems which facilitate the transmission of digital data between at least a pair of data processing apparatus which are disposed to communicate with each other over a telephone line. A first such data processing apparatus is shown schematically in FIG. 1 and designated by the reference numeral 11. The data from the first data processing apparatus 11 is encoded in a transmitter 13 which can be a double sideband suppressed quadrature carrier amplitude modulated transmitter. This data is then sent to first data access equipment 15 which interfaces with a plurality of telephone lines, including the line 17. In a preferred embodiment, the telephone line 17 is terminated through second data access equipment 19 by a receiver 21 which can be a double sideband suppressed carrier quadrature amplitude modulated receiver. In the receiver 21, the incoming signal is demodulated and decoded before it is forwarded to a second data processing apparatus 23. In this manner, the data from the first data processing apparatus 11 can be transmitted over the telephone line 17 to the second data processing apparatus 23.

The transmitter 13 is shown in greater detail in FIG. 2 between the first data processing apparatus 11 and the transmission data access equipment 15. An encoder 25 is connected to the data processing apparatus 11 and adapted to receive straight binary digititized data therefrom at a particular rate such as 2400 bps or 4800 bps. Within the encoder 25, incoming data is randomized, differentially encoded, and separated into an in-phase channel and a quadrature channel, which have been so designated for a reason which will be subsequently apparent. These channels will herinafter be referred to as the I channel and the Q channel respectively.

At the output of the encoder 25, the signals in the I and Q channels respectively, can include digital words or symbols $dI_j$ and $dQ_j$, respectively, where the sub $j$ implies the $j$th data symbol in a continuous series of the symbols, $dI$, $dQ$. Each of the data symbols $dI_j$ and $dQ_j$ expresses one of a plurality of data levels, the number of which depends on the speed of the operation. For example, if data is being transmitted at a rate of 2400 bps, the digital symbols will typically express data levels of $\pm$ 1. For 4800 bps operation, the symbols will typically express one of four levels such as $\pm$ 3 and $\pm$ 1. In the latter case, the digital symbols will each contain 2 binary bits to express one of the four levels. The digital symbols will typically occur at the rate of 1200 per second so that the modem throughput is 1200 symbols per second per channel, times b 2 bits per symbol, times 2 channels or 4800 bps.

Properly encoded, the input data bits at 4800 bps or 2400 bps appear at the inputs to one of a pair of lowpass filters 31 and 33 as the data symbols $dI_j$ and $dQ_j$, respectively. These filters 31 and 33 can be transversal filters comprising a series of delay stages and means for sequentially multiplying each of the data symbols $dI_j$ and $dQ_j$ by a plurality of fixed multiplying coefficients each of which is associated with one of the delay stages. The filters 31 and 33 in combination with similar filters in the receiver 21 are tuned to provide the system with (1,1)

partial response signaling which will be discussed subsequently in greater detail. The products resulting from the multiplication of the data symbols $dI_j$, $dQ_j$ and the multiplying coefficients of the filters 31,33 are summed to provide the outputs of the respective filters 31 and 33. These digital signals may be expressed as follows in the respective I and Q channels:

$$WI_j = \sum_{-k_1}^{k_2} dI_{j+k} gI_{-k}$$

$$WQ_j = \sum_{-k_1}^{k_2} dQ_{j+k} gI_{-k}$$

Equation (1)

where $gI_{-k}$ are the multiplying coefficients of the multipliers in the digital lowpass filters 31 and 33. A particular multiplying coefficient might be designated $gI_o$ in which case the coefficients of consecutively preceding multipliers in the series might be designated $gI_{-1}$, $gI_{-2}$ ... $gI_{-k_1}$. The coefficients consecutively following multipliers might be designated $gI_1$, $gI_2$ ... $gI_{k_2}$. This type of digital notation will be discussed in greater detail below. Additionally, transversal filters and other background material relating to the present invention can be found in R. Lucky an J. Salz and E. Weldon, *Principles of Data Communication* (McGraw-Hill, 1968).

After being appropriately filtered, the signals in the I and Q channels can then be introduced to multipliers 32 and 34, respectively, wherein they are multiplied at a carrier frequency such as 1600 Hertz by digital quantities from a sine/cosine ROM 35. For example, the signal in the I channel can be multiplied at the baud rate consecutively and repeatedly by the sine of the angles 120°, 240°, and 360°. The signal in the Q channel can be multiplied by the cosine of these angles. These modulated signals can then be combined in an adder 37, converted to analog format in a digital-to-analog converter 39, and smoothed by an analog lowpass filter 41. In its analog format, this signal transmitted on the telephone line 17 can be expressed as follows:

$$s(t) = WI_j \cos\omega_c t + WQ_j \sin\omega_c t \qquad (2)$$

where:

$WI_j$ and $WQ_j$ are the jth data symbols of the in-phase and quadrature components of the baseband signal; and $\omega_c$ is the radian frequency of the sine/cosine ROM 35.

The signal transmitted on the telephone line 17 may be altered to a greater or lesser extent, depending on the quality of the line 17. For example, the line 17 may cause the entire data spectrum to shift; this is typically referred to as frequency offset. A poor quality telephone line 17 may also produce phase jitter so that the carrier phase of the received signal varies in a generally sinusoidal manner with respect to the carrier phase of the transmitted signal. There may also be an initial difference between the carrier phase of the transmitter 13 and the carrier phase of the receiver 21. This is commonly referred to as phase offset.

If the telephone line 17 is of poor quality, it may also produce asymmetrical as well as symmetrical delay and attenuation distortion. This distortion is based on the treatment the telephone line 17 gives each particular frequency in the spectrum with respect to the carrier frequency. For example, some of the frequencies in the spectrum will experience a greater delay than other frequencies in the spectrum. Similarly, the telephone line 17 may attenuate some frequencies more than others. It is, of course desirable that the receiver 21 be able to compensate for all of these undesirable characteristics of the telephone line 17 in order to minimize the error between the signal received and the signal transmitted.

The receiver 21, which is shown in greater detail in the block diagram illustrated in FIG. 3, will be discussed generally before a detailed description of its elements is undertaken.

To emphasize the distorted characteristics of the transmitted signal, the signal input to the receiver 21 in FIG. 3 is designated $s'(t)$. This signal $s'(t)$ is substantially the transmitted signal $s(t)$ plus all channel distortions. In addition to the phase and frequency offset, and phase jitter, this channel distortion will include gaussian and impulse noise as shown below:

$$s'(t) = \{WI_j \cos[W_c t + \phi(t)] + WQ_j \sin[W_c t + \phi(t)]\} * c(t) + n(t) \qquad (3)$$

where $\phi$ is the phase error produced by the line 17;

$n(t)$ is the gaussian and impulse noise;

* is convolution integral; and $c(t)$ is the channel impulse response, a function of delay and attenuation distortions.

The input analog signal $s'(t)$ from the telephone line 17 is introduced through data access equipment 19 to an analog bandpass filter and automatic gain control 43 which selects the desired passband and signal level. An analog-to-digital converter or sampler 45 is provided to sample the incoming analog signal at a rate, such as 4800 times per second, corresponding to some integer multiple of the symbol rate of the transmitter 13.

The period of time devoted to a single sample of the analog signal $s'(t)$ is equal to the reciprocal of the sampling rate. If the sampling rate is 4800 samples per second, the interval of time devoted to a single sample would be 1/4800 second. This interval of time is commonly referred to as the sampling interval.

In many of the equations used herein, the signals and symbols will be provided with a sub j which designates the particular signal or symbol which occurs in the jth baud interval. For example, a symbol taken in a particular baud interval might be designated $dI_j$. A sample taken at a preceding baud interval would then be designated $dI_{j-1}$ and a sample taken in a following baud interval would be designated $dI_{j+1}$. Thus if numbers were assigned for a particular jth data sample, such as the thirtieth data sample $dI_{30}$, the preceding sample would be designated $dI_{29}$ and the following data sample would be designated $dI_{31}$. Thus a series of these samples would occur in time as $dI_{29}$, $dI_{30}$, and $dI_{31}$.

Following the sample 45 and throughout the remainder of the receiver 21 all signals will have a digital format. The digital signal from the sampler 45 can be separately multiplied in each of a pair of multipliers 46 and 48 by a sine/cosine ROM 47. In this manner, the signal can be non-coherently demodulated and separated into an in-phase channel and a quadrature channel, which will also be referred to throughout the receiver 21 as the I channel and the Q channel respectively.

From the multipliers 46 and 48, the signals in the I and Q channels can be introduced to respective digital lowpass filters 53 and 55 to select and to shape the desired baseband from the demodulated signals. It is the filters 53 and 55 in the receiver 21 which were previously referred to as being tuned with the filters 31 and 33 in the transmitter 13 to provide the (1,1) partial response signaling which will be explained in greater detail below.

Ideally the (1,1) partial response signaling provides a seven-level signal at the output of each of the lowpass filters 53 and 55 for a 4-level data sequence at the transmitter. In terms of the input data symbols $dI_j$ and $dQ_j$ these seven-level partial response signals, which will be designated $DI_j$ and $DQ_j$, can be expressed as follows:

$$DI_j = dI_j + dI_{j-1}$$
$$DQ_j = dQ_j + dQ_{j-1}$$
(4)

Thus, the $j$th seven-level partial response signal in the I channel ($DI_j$) is equal to the $j$th input data sample in the I channel ($dI_j$) plus the input data sample which preceded the $j$th data sample in the I channel ($dI_{j-1}$). Similarly the $j$th seven-level partial response signal in the Q channel ($DQ_j$) is equal to the $j$th input data sample in the Q channel ($dQ_j$) plus the input data sample which preceded the $j$th data sample in the Q channel ($dQ_{j-1}$).

If the signals from the filters 53 and 55 were ideal, the seven-level signals $DI_j$ and $DQ_j$ could be detected at this point and decoded to provide the binary data transmitted.

Since the signals at the outputs of the lowpass filters 53 and 55 will typically not be ideal but rather will be polluted by channel distortions, phase error, and other forms of noise, they will be designated by the notation XI and XQ. In terms of the incoming signal $s'(t)$ these pre-equalized signals can be expressed as follows:

$$XI = [s'(t)\cos\omega_c t] * gI(t)$$
$$XQ = [s'(t)\sin\omega_c t] * gI(t)$$
(5)

where:
* is convolution integral; and
$gI(t)$ is the response of the filter 53 or filter 55.

Following the filters 53 and 55, these two baseband signals XI and XQ in the I and Q channels respectively are introduced to an equalization network 57. Such a network 57 may contain a pair of transversal equalizers 100 and 102 for the I channel and a pair of transversal equalizers 104 and 106 for the Q channel. This network 57 corrects for the asymmetrical as well as the symmetrical delay and attenuation distortion of the telephone line 17. At the output of the equalization network 57, the signals in the I and Q channels, which will be designated YI' and YQ' respectively, can be expressed as follows:

$$YI'_j = \sum_n CI_n XI_{j-n} - \sum_n CQ_n XQ_{j-n}$$
$$YQ'_j = \sum_n CI_n XQ_{j-n} + \sum_n CQ_n XI_{j-n}$$
(6)

where, as will be explained in greater detail below:
CI and CQ are equalizer multiplying coefficients in the respective channels; and
n signifies the maximum number of multipliers in each of the equalizers 100, 102, 104 and 106.

In the phase correction network 59 the equalized signals YI' and YQ' are multiplied by sine and cosine values of a phase angle $\phi'$ which is generated in the network 59 and which is dependent on the phase error $\phi$. At the output of the phase correction network 59, the equalized and phase corrected signals, which will be designated YI and YQ in the respective I and Q channels, can be expressed as follows:

$$YI_j = YI'_j \cos\phi' - YQ'_j \sin\phi'$$
$$YQ_j = YQ'_j \cos\phi' + YI'_j \sin\phi'$$
(7)

At the output of the phase correction network 59, the signals YI and YQ have been equalized and phase corrected. Thus, most of the distortion which prevented the pre-equalized signals XI and XQ from being ideal, has been removed. It follows that the signals YI and YQ are substantially the ideal seven-level symbols DI and DQ. These signals YI and YQ, can be introduced to detectors 61 and 63 in the respective I and Q channels. The detectors 61 and 63 are threshold detectors which determine which of the 7 possible levels the $YI_j$ and $YQ_j$ signals most closely approximate. The seven-level symbols $DI_j$ and $DQ_j$ are then provided at the output of the respective detectors 61 and 63. A decoder 79 decodes the seven level symbols DI and DQ to provide the four-level symbols $dI_j$ and $dQ_j$ in accordance with the following equation:

$$dI_j = DI_j - dI_{j-1}$$
$$dQ_j = DQ_j - dQ_{j-1}$$

(Previously designated Equation 4)

The decoder 79 also decodes the four level symbols $dI_j$ and $dQ_j$ to provide the binary data which is introduced to the second data processing apparatus 23.

In a preferred embodiment, the error calculator 65 provides an error signal for updating the equalization of the network 57 and the phase correction of the network 59. Furthermore, in a manner to be discussed, the timing of the sampler 45 can be made responsive to the updated characteristics of the equalization network 57. Thus the timing, equalization, and phase correction of the receiver 21 can be corrected by a single error calculator 65 to compensate for the deficiencies of the incoming signal. With the correction of these characteristics, the detected data from the detectors 61 and 63 can be introduced to the decoder 79 wherein the signals are differentially decoded, derandomized, and introduced to the second data processing apparatus 23.

Preliminary to a detailed discussion of this system in general, it may be of advantage to summarize the notation set forth above, to discuss (1,1) partial response signaling, and to derive the system error signals which can be used to update the system corrections.

As set forth above the following notation will be used throughout the remainder of the detailed description to designate the quantities indicated:
XI = the pre-equalized signal in the I channel;
XQ = the pre-equalized signal in the Q channel;
YI' = the equalized signal in the I channel preceding the phase correction network 59;
YQ' = the equalized signal in the Q channel preceding the phase correction network 59;
YI = the equalized and phase corrected signal in the I channel;

YQ = the equalized and phase corrected signal in the Q channel;

DI = the partial response data symbols in the I channel; and

DQ = the partial response data symbols in the Q channel.

Further discussion of partial response signaling is facilitated by the realization that although the signals following the sampler 45 in the receiver 21 are digital, they nonetheless correspond to analog signals in an analog embodiment of the invention. If the input signal to the transmitter 13 were an impulse, an analog signal at the output of the phase correction network 59 under ideal conditions might have a waveform such as that shown as $l(t)$ in FIG. 7A. This waveform $l(t)$, which is characterized by a peak 201 and a plurality of zero crossings 203 on either side of the peak 201, is the ideal impulse response of the receiver 21. In a digital embodiment, the sampler 45 samples an impulse in the signal $s'(t)$ so that digital values appear at the output of the phase correction network 59. These digital values are typically designated by the script letter $l$.

If the timing of the sampler 45 is accurate, most of the $l$ values at the output of the phase correction network 59 will have zero values corresponding to the zero crossings 203 of the waveform $l(t)$. However, at the time $+T/2$ (corresponding to the leading edge of the impulse response) and the time $-T/2$ (corresponding to the trailing edge of the impulse response) the $l$ values will have equal values which are typically normalized to unity. The particular $l$ values are commonly designated $l_o$ and $l_b$, respectively. The time T is the sampling period of the sampler 45 which corresponds to the baud interval previously discussed.

If the timing of the sampler 45 is adjusted to sample the $l(t)$ waveform at the zero crossings 203, and if the values $l_o$ and $l_l$ are normalized to one, the values appearing at the output of the phase correction network 59 will be 00011000. With these characteristics, this type of signaling is commonly referred to as (1,1) partial response signaling.

Using the above summarized notation, it will now be shown how error signals can be derived from the data present in the receiver 21. A portion of the error calculator 65 is illustrated in FIG. 4 wherein it will be noted that the DI and DQ signals from the detectors 61 and 63 are introduced to a pair of multipliers 62 and 64, respectively. Also introduced to the multipliers 62 and 64 is a quantity $\hat{l}_o$ which is generated by a decision threshold control 77 to be discussed subsequently. This quantity $\hat{l}_o$ is an updated estimate of the first sampled value $l_o$ of the $l(t)$ impulse response previously discussed.

From the multipliers 62 and 64, the signals DI$\hat{l}_o$ and DQ$\hat{l}_o$ are respectively introduced to the negative terminals of a pair of differential adders 66 and 68. The equalized signals YI and YQ are introduced to the positive terminals of the adders 66 and 68 respectively so that at the outputs of the adders 66 and 68, the following error signals are provided for the I channel and the Q channel, respectively:

$$EI = YI - DI\,\hat{l}_o$$
$$EQ = YQ - DQ\,\hat{l}_o$$

(8)

In the error calculator 65, these error signals appear at a pair of terminals 70 and 72, respectively.

Having established a standard notation, discussed partial response signaling, and derived the error signals EI and EQ, the operation of the receiver 21 will now be described in greater detail.

As previously discussed with reference to FIG. 3, the signal received by the sampler 45 is an analog signal which is substantially the signal transmitted by the transmitter 13, but which has typically been garbled by the imperfections of the telephone line 17. As noted, this incoming signal may be expressed as follows:

$$s'(t) = \{WI_j \cos[W_c t + \phi(t)] + WQ_j \sin[W_c t + \phi(t)]\}^* \quad \text{(previously designated Equation 3)}$$
$$c(t) + n(t)$$

In the sampler 45, this signal $s'(t)$ preferably is sampled at a rate, such as 4800 times per second, corresponding to a multiple of the symbol rate of the transmitter 13. The sampler 45 can be responsive to plus or minus 512 discrete levels and the information taken at each sample can be expressed in a 10-bit digital word. This digital signal can then be introduced to the pair of multipliers 46 and 48.

In the multipliers 46 and 48, these digital signals are multiplied by quantities received from a sine/cosine ROM 47 having a carrier frequency, such as 1600 Hertz, substantially equal to the frequency of the sine/cosine ROM 35 in the transmitter 13. For example in the multiplier 46, the digital information can be sequentially multiplied at the sampler rate of 4800 times per second by the cosine of the angles 120°, 240°, and 360°. Similarly in the multiplier 48, the digital information can be multiplied at the sampler rate of 4800 times per second by the cosine of the angles 120°, 240°, and 360°. It will be noted that, although the carrier frequencies of the ROM 35 and the ROM 47 may be equal, the phase relationships of the carriers may not be equal in which case the signal is said to be non-coherently demodulated.

The 1600 Hertz carrier frequency is particularly desirable because it places the data passband of 1200 Hertz between 1000 Hertz and 2200 Hertz in the telephone line passband. This leaves sufficient passband to accommodate a 150 Hertz secondary control channel both above and below the data passband. The 1600 Hertz carrier is also desirable because it is one-third the sampling frequency of 4800 bps. Thus, sine and cosine values of three equally spaced angles 120°, 240°, and 360°, can provide the multiplying quantities for demodulation. The sines of these angles are 0.866, −0.866, and zero; while the cosine of these angles are −0.5, −0.5, and 1. It follows that the 1600 Hertz frequency enables the ROMs 35 and 47 to function by merely storing the digital quantities of 0.5 and 0.866. Appropriate sign changes of these values provide the multiplying quantities desired.

When the incoming signal is demodulated in the foregoing manner, sine squared terms, cosine squared terms, and sine/cosine terms may be produced, each of which has undesirable components of frequency twice that of the carrier frequency of the ROM 47. For this reason, the resulting products in the I and Q channels are introduced into the digital lowpass filters 53 and 55, respectively, wherein the double frequency terms are eliminated.

The filters 53 and 55 are transversal filters of the type described with reference to the filters 31 and 33 in the transmitter 13. Thus they typically consist of a series of delay stages each sequentially receiving the digital samples and each multiplying the samples by one of a plurality of multiplying coefficients. The resulting products can be added at the rate of 1200 times per second and the sums rounded off to 12-bit digital words.

For symbols transmitted at the ideal Nyquist rate of $2\omega$ symbols over an ideal channel having a bandwidth of $\omega$ Hertz, the filters 33, 35 and 53,55 can be tuned to provide composite signal shaping characteristics of:

$$H(\omega) = 2T\cos(T\omega/2)$$

for $(\omega) \leq \pi/T$ and $H(\omega) = 0$ for $(\omega) > \pi/T$ where $T$ is the symbol period.

In the absence of channel distortion, the signal shaping characteristics of the filters 33, 35 and 53,55 provide their respective channels with an impulse response of:

$$h(t) = \frac{4}{\pi} \left[ \frac{\cos(\pi t/T)}{1 - 4t^2/T^2} \right] \tag{9}$$

Figure 7B:
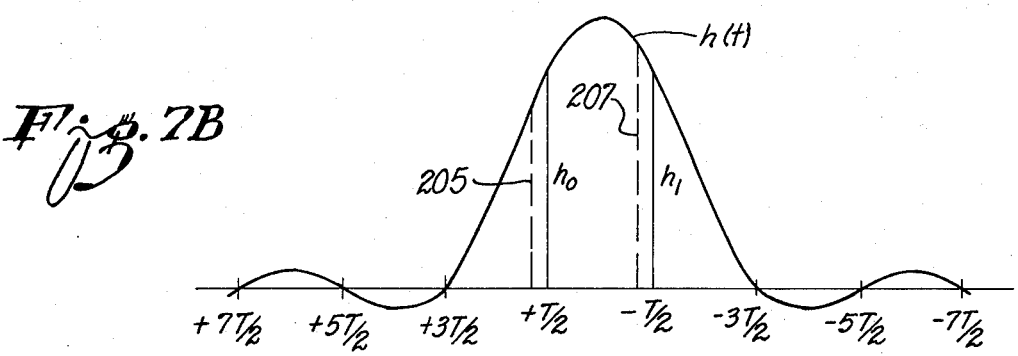
FIG. 7B is a waveform showing the ideal $h(t)$ impulse response characteristic of the receiver.

This ideal impulse response $h(t)$ is illustrated by the waveform in FIG. 7B wherein the sampling times of the sampler 45 are designated along the abscissa. It can be shown that the impulse response $h(t)$ is equal to unity at the sampling time $\pm T/2$ and zero for all other sampling times separated from the times $\pm T/2$ by one baud interval $T$. If the sampler 45 provides samples at these times, the receiver 21 will respond to an impulse in the $s'(t)$ signal by providing at the output of the lowpass filters 55 and 53 $h$ values of 00011000.

The signal shaping provided by the filters 33,35, 53,55 and the sampling provided by the sampler 45 provide the (1,1) partial response signaling which is particularly desirable in the present invention. This type of signaling permits the seven-level symbols $DI_j$, $DQ_j$ to be expressed in terms of the four-level data symbols $dI_j$ and $dQ_j$ as shown by Equation 4. It follows that the only intersymbol interference present in the seven-level symbols $DI_j$ and $DQ_j$ is that associated with the preceding four-level symbol $dI_{j-1}$ and $dQ_{j-1}$. This relationship permits decoding of the data by subtracting the preceding symbol $d_{j-1}$ from the present $D_j$ to determine the present symbol $d_j$.

Partial response signaling is also desirable since it provides a practical method for transmitting data at the Nyquist rate of $2\omega$ symbols over a channel having a width of $\omega$Hertz. In the present invention, it permits 1200 symbols per second to be transmitted through a baseband of only 600 Hertz. When this signal is modulated on a carrier, it becomes a 1200 Hertz passband signal.

The present invention deals primarily with the timing of the sampler 45. With reference to FIG. 7B it will be noted that if the timing of the sampler 45 is retarded the $h$ values will not be the ideal values 00011000, but rather the $h$ values will be distorted. For example, with advanced timing, the value of $h_o$ will be reduced as shown by the height of the dotted line 205 and the magnitude of the $h_1$ value will be increased as shown by the height of the dotted line 207. The other $h$ values will vary from their ideal zero values. If the timing is retarded, the value of $h_o$ will increase while the value of $h_1$ will decrease.

It would seem to be possible to monitor the $h$ values at a particular zero crossing in the $h(t)$ signal to determine whether or not the timing was early or late. Although this is theoretically possible, it must be kept in mind that the $h(t)$ signal is not actually present in the receiver 21. It is only an impulse response and therefore its $h$ values cannot actually be monitored.

Figure 7C:
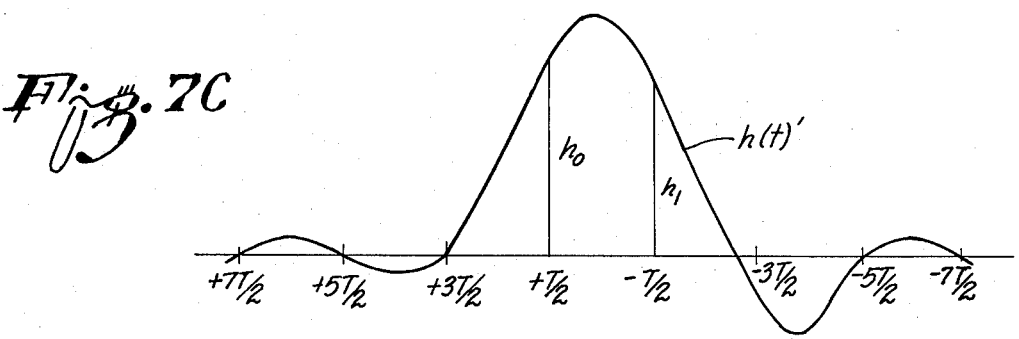
FIG. 7C is a waveform showing a realistic $h(t)'$ impulse response characteristic of the receiver.

To further complicate timing correction with respect to the $h(t)$ signal, it will be noted that this impulse response is typically distorted by the characteristics of the channel. As noted, the channel, and primarily the telephone line 17, provides the signals in the receiver 21 with delay and attenuation distortions which result in intersymbol and interchannel interference. These undesirable characteristics provide a more realistic impulse response signal such as that designated $h(t)'$ in FIG. 7C. In such a signal, the $h$ values would be distorted not only by the timing but also by the interchannel and intersymbol interference.

With data in the form of the symbols $dI_j$ and $dQ_j$ in the respective I and Q channels, the signals at the input to the equalization network 57 can be expressed in terms of the impulse response $h$ values as follows:

$$XI_j = \sum_i dI_{j+i} hI_{-i} + \sum_i dQ_{j+i} hQ_{-i} \tag{10}$$

$$XQ_j = \sum_i dQ_{j+i} hI_{-i} - \sum_i dI_{j-i} hQ_{-i}$$

where:

$hI$ and $hQ$ are the sample values of the equivalent baseband in-phase and quadrature impulse response characteristics of the $I$ and $Q$ channels resulting only from filter shaping and channel distortion; and sub $i$ signifies the maximum number of significant terms of the $hI$ and $hQ$ sample values.

It will be noted with reference to Equation 10 that the signal $XI_j$ at the input of the equalizer 57 can be expressed in terms of the input data symbols $dI_j$ and the $hI$ sample values of the impulse response $h(t)$ in the I channel. In addition, if there is interchannel distortion, the signal $XI_j$ in the I channel will include some components of the input symbols $dQ_j$ in the Q channel. It will now be noted that if there is no interchannel interference there will be no $dQ_j$ terms in the $XI_j$ signal. Furthermore, if there is no I channel distortion, the impulse response $h(t)$ will provide the ideal $h$ values of 00011000. Under these circumstances wherein $h_o$ and $h_l$ equal 1 and all other $h$ values equal zero, the only symbols $dI_j$ which will be multiplied by an $h$ value other than zero will be the symbols $dI_j$ and $dI_{j+1}$. The summation of these two data input symbols has already been shown in Equation 4 to be equal to the partial response data symbols $DI_j$.

If the $hI$ values which would ideally be zero have some value other than zero, they will provide undesirable products with their associated data symbols in Equation 10. These undesirable products interfere with the ideal $XI_j$ value so that this type of distortion is commonly referred to as intersymbol interference. From this analysis it follows that if there were no phase error and no interchannel or intersymbol interference, the partial response values $DI_j$ could be detected immediately following the filters 53 and 55. Of course there will be these types of distortions so the signals XI and XQ are first equalized in the network 57 and phase corrected in the network 59 before they are detected.

Since the input data symbols $dI_j$ can be expressed in terms of the partial response data symbols $DI_j$ as shown by Equation 4, it is apparent that the preequalized signals $XI_j$ and $XQ_j$ can also be expressed in terms of partial response data signals $DI_j$ and $DQ_j$ as follows:

$$XI_j = \sum_i DI_{j+i} pI_{-i} + \sum_i DQ_{j+i} pQ_{-i} \quad (11)$$

$$XQ_j = \sum_i DQ_{j+i} pI_{-i} - \sum_i DI_{j+i} pQ_{-i}$$

It can be seen from the similarity of Equations 10 and 11 that the $h$ values correspond to the response $h(t)$ of the receiver 21 to an impulse in the $s(t)'$ signal which provides the symbols $dI_j$ and $dQ_j$. In contrast, the $p$ values correspond to a response $p(t)$ to an impulse in a theoretical signal providing the symbols $DI_j$ and $DQ_j$. Since no such theoretical signal actually exists in the receiver 21, these $p$ values are purely hypothetical and do not directly relate to the quantities in the receiver 21.

As was the case with the $h(t)$ impulse response, it would be desirable to monitor the sample values of the $p(t)$ signal in order to control timing. Sample $p$ values varying from an ideal zero value could then provide indications of timing error. However, the $p(t)$ signal is also an impulse response and therefore is not actually present in the receiver 21.

If the partial response data symbols DI and DQ can be expressed in terms of the input data symbols $dI$ and $dQ$, as shown in Equation 4, it follows that the impulse response $p$ values can also be expressed in terms of the impulse response $h$ values:

$$pI_{-i_1} = hI_{-i_1}$$

$$pI_{-i_1+1} = hI_{-i_1+1} - pI_{i_1}$$

and, in general,
$$pI_{-i_1+i} = hI_{-i_1+i} - pI_{-i_1+i-1} \quad (12)$$

similarly, in general,
$$pQ_{-i_1} = hQ_{-i_1}$$

$$pQ_{-i_1+i} = hQ_{-i_1+i} - pQ_{-i_1+i-1}$$

From Equation 12 it can be seen that in response to an impulse from the transmitter 13 the ideal impulse response $h$ values of 00011000 would correspond to ideal impulse response $p$ values of 0001000.

Figure 7D:
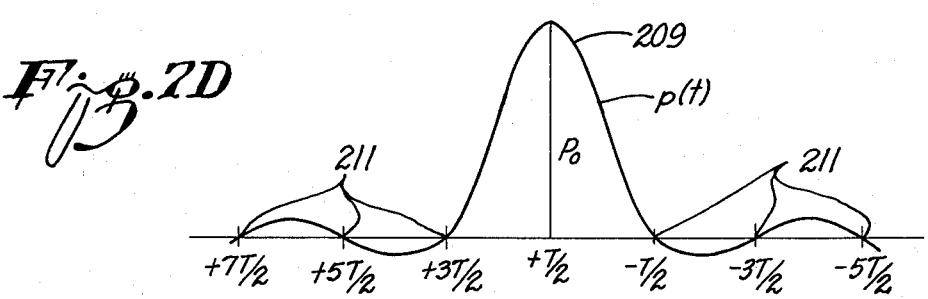
FIG. 7D is a waveform showing the ideal $p(t)$ impulse response of the receiver.

An ideal waveform of the impulse response $p(t)$ corresponding to these ideal $p$ values would be that illustrated in FIG. 7D wherein the ideal sampling times are designated by the fractions of the baud interval T along the abscissa. This ideal waveform $p(t)$ is characterized by a peak 209 and a plurality of zero crossings 211 on either side of the peak 209. If the timing of the sampler 45 were accurate, an impulse from the transmitter 13 would be sampled at times corresponding to the zero crossings 211 and the center of the peak 209 of the $p(t)$ impulse response. Theoretically, these samples would thus provide the ideal $p$ values of 0001000.

With reference to Equation 11, it will be noted that if all of the $p$ values, except the particular $p$ value taken at the time $+T/2$, have zero values, and the particular $p$ value is normalized to one, there would be no interchannel interference and no intersymbol interference. It follows that the signals $XI_j$ and $XQ_j$ would be equal to $DI_j$ and $DQ_j$ respectively.

Figure 7E:
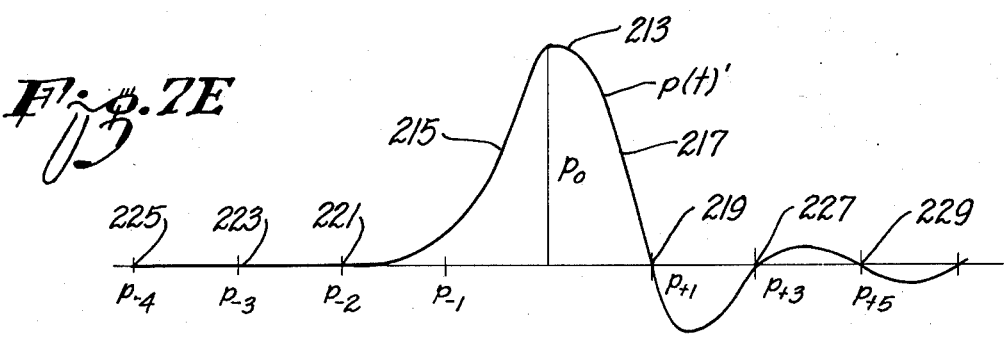
FIG. 7E is a waveform showing a realistic $p(t)'$ impulse response characteristic of the receiver.

Of course under normal conditions there will be both delay and attenuation distortions in the channel so that a realistic impulse response $p(t)'$ might have a waveform such as that shown in FIG. 7E. This impulse response $p(t)'$ is characterized by a peak 213 having a leading edge 215 sloping gently from a zero level to the top of the peak 213. A trailing edge 217 falls sharply from the top of the peak 213 and crosses the zero level almost perpendicular to the abscissa at a point 219.

The $l(t)$ impulse response resulting from signal shaping, channel distortions, and equalization has been discussed with reference to FIG. 7A. It should now be noted that if equalization is perfect, the ideal $l$ values will correspond to ideal $h$ values and Equation 10 can be rewritten in terms of the $l$ values to provide equations for the equalized signals YI and YQ:

$$YI_j = \sum_k dI_{j+k} lI_{-k} + \sum_k dQ_{j+k} lQ_{-k} \quad (13)$$

$$YQ_j = \sum_k dQ_{j+k} lI_{-k} - \sum_k dQ_{j+k} lQ_{-k}$$

where:
$lI$ and $lQ$ are the sample values of the equivalent baseband in-phase and quadrature impulse response characteristics of the I and Q channels resulting from not only filter shaping and channel distortion but also equalization; and sub $k$ signifies the maximum number of significant terms of the $lI$ and $lQ$ sample values.

If equalizaton is considered, Equation 11 can also be rewritten in terms of the data symbols $DI_j$ and $DQ_j$ and samples of a theoretical impulse response $m(t)$. Thus the equalized signals can also be expressed as:

$$YI_j = \sum_i DI_{j+i} mI_{-i} + \sum_i DQ_{j+i} mQ_{-i} \quad (14)$$

$$YQ_j = \sum_i DQ_{j+i} mI_{-i} - \sum_i DI_{j+i} mQ_{-i}$$

where:
$mI$ and $mQ$ are the sample values of the equivalent baseband in-phase and quadrature impulse response characteristics of the $I$ and $Q$ channels resulting from not only filter shaping & channel distortion but also equalization; and $k$ signifies the maximum number of significant terms of the $mI$ and $mQ$ sample values.

It can be seen from the similarity of Equations 13 and 14 that the $m$ values correspond to a response to an impulse in a theoretical signal providing the partial response symbols $DI_j$ and $DQ_j$.

As was the case with the $h$ values and $p$ values it can also be shown that the $m$ values and $l$ values have in general the following relationship:

$$mI_{-i_1+i} = lI_{-i_1+i} - mI_{-i_1+i-1}$$
$$mQ_{-i_1+i} = lQ_{-i_1+i} - mQ_{-i_1+i-1} \quad (15)$$

It is the purpose of the equalization network 57 to eliminate all of the interchannel and intersymbol interference resulting from channel distortion. In other words it is a purpose of the equalization network 57 to alter an impulse response, such as that designated $h(t)'$ in FIG. 7C, so that it looks like the impulse response designated $l(t)$ in FIG. 7A. It follows that it is the purpose of the equalization network 57 to vary the impulse response characteristics of the channels so that distorted $h$ values (having values other than the ideal 00011000 $h$ values) will correspond to values which closely approximate the ideal $l$ values 00011000.

Referring now to FIG. 5, it will be noted that the transversal equalizers 100, 102, 104 and 106 are similar to the transversal filters 53 and 55 except the multiplying coefficients are variable. Thus, the equalization network 57 can include a series of storage registers 85 and 87 for the respective I and Q channels. At the rate of 1200 times per second, the 12-bit words in the $XI_j$ signal can be sequentially introduced into the registers 85, and the 12-bit words in the $XQ_j$ signal can be sequentially introduced into the registers 87. A series of in-phase multipliers 89 are provided to individually multiply each of the words in the registers 85 by a variable multiplying coefficient $CI_n$. The resulting in-phase products are introduced to an adder 91. Similarly, each of the registers 85 is connected to one of a series of quadrature multipliers 93, wherein the words of the $XI_j$ signal are individually multiplied by a variable multiplying coefficient $CQ_n$. These quadrature products are introduced to an adder 95.

Each of the series of registers 87 is connected to one of a series of in-phase multipliers 99 and one of a series of quadrature multipliers 97. Each of the in-phase multipliers 99 has a respective multiplying coefficient $CI_n$. Similarly each of the quadrature multipliers 97 has a respective multiplying coefficient $CQ_n$. The symbols in the register 87 are multiplied by the coefficients $CQ_n$ and $CI_n$ in the multipliers 97 and 99 respectively to produce quadrature products and in-phase products which are respectively introduced to a pair of adders 101 and 103.

An adder 105 combines the quantities from the adders 91 and 101 to provide the signal YI' at the output of the equalization network 57. In a differential adder 107, the signals from the adders 95 and 103 are substracted to provide the YQ' signal at the output of the equalization network 57. These output signals of the equalization network 57 can be expressed as a function of the input signals XI and XQ and the in-phase and quadrature equalizer multiplying coefficients $CI_n$ (89 and 99) and $CQ_n$ (93 and 97), respectively, as follows:

$$YI'_j = \sum_n CI_n XI_{j-n} + \sum_n CQ_n XQ_{j-n}$$

$$YQ'_j = \sum_n CI_n XQ_{j-n} - \sum_n CQ_n XI_{j-n}$$

(Previously designated Equation 6)

where $n$ signifies the number of multiplying coefficients in each of the multipliers 89, 93, 97 and 99.

The sample values of the impulse response characteristics $h(t)$ and $l(t)$ are similarly related by the multiplying coefficients $CI$ and $CQ$:

$$lI_k = \sum_n CI_n hI_{k-n} + \sum_n CQ_n hQ_{k-n} \quad (16)$$

$$lQ_k = \sum_n CI_n hQ_{k-n} - \sum_n CQ_n hI_{k-n}$$

where $k$ signifies the number of multiplying coefficients in each of the multipliers 89, 93, 97 and 99.

It will be recalled that the equalized signals YI' and YQ' in the absence of carrier phase error can be expressed in terms of the partial response symbols $DI_j$ and $DQ_j$ and the sample values of the impulse response $m(t)$:

$$YI'_j = \sum_i DI_{j+i} mI_{-i} + \sum_i DQ_{j+i} mQ_{-i}$$

$$YQ'_j = \sum_i DQ_{j+i} mI_{-i} - \sum_i DI_{j+i} mQ_{-i}$$

(Previously designated Equation 14)

It will aslo be recalled that ideally $YI'_j = DI_j$ and $YQ'_j = DQ_j$.

This desirable result is achieved if all values of $mQ_{-k}$ in Equation 14 are reduced to zero so that the DQ terms resulting from interchannel interference are removed from the $YI'_j$ signal; and all DI terms, other than $DI_j$, resulting from intersymbol interference are removed from the $YI'_j$ signal. In other words, $YI'_j = DI_j$ if:

$$mI_{-k} = \left\{ \begin{array}{l} 1 \text{ for } k=0 \\ 0 \text{ otherwise} \end{array} \right\}$$

and $$mQ_{-k} = 0 \text{ for all } k$$

Under these conditions, $$mI_o = lI_o = l_o$$

and Equation 14 reduces to the desired result for $l_o$ normalized to one:

$$YI'_j = DI_j$$

A similar analysis can be made for the quadrature channel to show that ideally $$YQ'_j = DQ_j$$

Notice that with this result, the equalization network 57 has eliminated all intersymbol interference due to symmetrical attenuation and delay distortion as shown by $mI_{-k} = 1$ for $k = 0$, and $mI_{-k} 32\ 0$ otherwise. It has also eliminated all intersymbol interference due to asymmetrical attenuation and delay distortion as shown by $mQ_{-k} = 0$ for all $k$.

If there is no phase error, the signals YI and YQ will equal the signals YI' and YQ' respectively. It follows that for a perfectly equalized and phase corrected signal, $YI_j = DI_j l_o$ and $YQ_j = DQ_j l_o$. Any deviation from this ideal signal represents system error, and the error signals EI and EQ which have been previously derived, can be generated accordingly:

$$EI_j = YI_j - DI_j \hat{l}_o$$

$$EQ_j = YQ_j - DQ_j \hat{l}_o$$

(Previously designated Equation 8)

where it will be recalled $\hat{l}_o$ is an estimator of $l_o$ provided by the decision threshold control 77.

Then, to adjust the equalizer multiplying coefficients $CI_n$ and $CQ_n$ these error terms can be cross-correlated with the appropriate detected partial response signals $DI_{j-n}$, $DQ_{j-n}$, where $n$ is less than or equal to the maximum number of multipliers to minimize the intersymbol interference. For example, referring to FIG. 5, in order to adjust the multiplying coefficient $CI_{-n_1}$, the error signals $EI_j$ and $EQ_j$ can be delayed by $n_1$ symbols so that $CI_{-n_1}$ is controlled by the crosscorrelation of signals dependent upon the following terms:

$(EI_{j-1})$ and $(DI_j)$
$(EQ_{j-n_1})$ and $(DQ_j)$

Similarly, the multiplying coefficient $CI_{-n_1+1}$ can be controlled by signals dependent upon the terms:

$(EI_{j-n_1})$ and $(DI_{j-1})$
$(EQ_{j-n_1})$ and $(DQ_{j-1})$ and, in general, the multiplying coefficient $CI_{-n_1+n}$ can be controlled by signals dependent upon the terms:

$(EI_{j-n_1})$ and $(DI_{j-n})$
$(EQ_{j-n_1})$ and $(DQ_{j-n})$ where $-n_1 < n < n_2$ Also, the multiplying coefficient $DQ_{-n_1+n}$ can be controlled, in general, by signals dependent upon the terms $(EQ_{j-n_1})$ and $(DQ_{j-n})$
$(EQ_{j-n_1})$ and $(DI_{j-n})$ For a particular implementation of these EI, EQ, DI and DQ terms, these signals for controlling the coefficients can be defined as follows:

$$E_1(n) = SGN(EI_{j-n_1}) \times SGN'(DI_{j-n_1-n})$$

$$E_2(n) = SGN(EQ_{j-n_1}) \times SGN'(DQ_{j-n_1-n})$$

(17)

$$E_3(n) = SGN(EQ_{j-n_1}) \times SGN'(DI_{j-n_1-n})$$

$$E_4(n) = SGN(EI_{j-n_1}) \times SGN'(DQ_{j-n_1-n})$$

where:

SGN is the sign of the term in parentheses; and
$SGN'(x) = SGN(x)$ for any $x$ quantity $\neq 0$
$SGN'(x) = 0$ for any $x$ quantity $= 0$ For a digitally implemented equalizer, each multiplying coefficient $CI_n$ and $CQ_n$ is a digital number (typically a 12-bit coefficient) that can be incremented or decremented 1 or more steps each symbol. Typically, a 12-bit coefficient has 2 raised to the 12th power, or 4096 total steps, or 2048 positive and 2048 negative steps. Then all $CI_n$ for $(-n_1 < n < n_2)$ except $CI_o$, which is set at the maximum positive value, can be adjusted as follows:

| | | $CI_n$ (Steps) | |
|---|---|---|---|
| $E_1(n)$ | $E_2(n)$ | Incremented | Decremented |
| + | + | | 2 |
| + | 0 | | 1 |
| + | − | | |
| 0 | + | | 1 |
| 0 | 0 | | |
| 0 | − | 1 | |
| − | + | | |
| − | 0 | 1 | |
| − | − | 2 | |

Also, all $CQ_n$ for $(-n_1 < n < n_2)$ except $CQ_o$ which may be 0 can be adjusted as follows:

| | | $CQ_n$ (Steps) | |
|---|---|---|---|
| $E_3(n)$ | $E_4(n)$ | Incremented | Decremented |
| + | + | | |
| + | 0 | | 1 |
| + | − | | 2 |
| 0 | + | 1 | |
| 0 | 0 | | |
| 0 | − | | 1 |
| − | + | 2 | |
| − | 0 | 1 | |

| | | $CQ_n$ (Steps) | |
|---|---|---|---|
| $E_3(n)$ | $E_4(n)$ | Incremented | Decremented |
| − | − | | |

The signals $E_1$, $E_2$, $E_3$, and $E_4$ can be derived in an equalization control network 69 which is connected to receive inputs of DI, DQ, EI and EQ from the error calculator 65. The functions $E_1$ and $E_2$ can be correlated to step the coefficients of the in-phase multipliers 89 and 99, as shown in FIG. 5. Similarly, the functions $E_3$ and $E_4$ can be correlated to step the coefficients of the quadrature multipliers 93 and 97 in accordance with the preceding tables.

Thus it has been shown that the multiplying coefficients CI and CQ can be adjusted using the error terms $E_1$, $E_2$, $E_3$, and $E_4$. Furthermore, the specific error terms disclosed change the multiplying coefficients CI and CQ, and hence impulse response sample values mI and mQ, such that the following favorable result is approached:

$$MI = \begin{cases} 1 \text{ for } k = 0 \\ \text{and} \\ 0 \text{ otherwise} \end{cases}$$
$$-k$$
$$mQ = \quad 0 \text{ for all } k$$
$$-k$$

$$mQ_{-k} = 0 \text{ for all } k$$

This eliminates all intersymbol interference due to assymetrical and symmetrical delay and attenuation distortion in the manner previously discussed.

Other equalization error terms having values proportional to the magnitude of the EI and EQ signals could also be derived to facilitate proportional adjustment of the equalizer multiplying coefficients. Such error terms are considered to be obvious to one of ordinary skill in the art.

In this particular implementation, an automatic adaptive equalization technique has been described that is specifically implemented for, but not necessarily limited to, operation with the (1,1) partial response signaling technique. The equalization technique is designed for simple and inexpensive all-digital implementation. It corrects for asymmetrical as well as symmetrical attenuation and delay distortion occurring on telephone channels. The particular implementation described utilized the detected partial response signals DI and DQ to effect equalization. This allows the equalization network 57 to be placed ahead of the phase correction loop, thus providing for a much improved high-frequency phase jitter correction capability. The equalization network 57 learns on random data transmission, and does not require the use of any special tones or transmission preamble. It also utilizes the majority vote of both channels to effect a fast as well as an effective equalization capability.

It is now of interest to note that the multiplying coefficients CI and CQ have a particular relationship to the sample $p$ values of the impulse response $p(t)$. In order to simplify the notation in this phase of the discussion, it will be assumed that the channel being considered could be any channel, such as the I or Q channel, providing data signals $X_j$ and equalized signals $Y_j$ at the input and output respectively of an equalizer having multiplying coefficients $C_n$.

It will also be assumed that the sampling of the impulse response $p(t)$ provides only three sample values of significance: $p_{-1}$, $P_0$, and $P_{+1}$. Using these specific values in Equation 11, three sequential data signals can be expressed as follows:

$$X_{j+1} = D_{j+2}p_{-1} + D_{j+1}p_0 + D_j p_1$$

$$X_j = D_{j+1}p_{-1} + D_j p_0 + D_{j-1}p_1$$

$$X_{j-1} = D_j p_{-1} + D_{j-1}p_0 + D_{j-2}p_1$$

If it is further assumed that a particular equalizer, such as the equalizer 100, has only three multipliers, then their respective multiplying coefficients can be designated $C_{-1}$, $C_0$, and $C_{+1}$. Of course the more multipliers a particular equalizer has, the more accurate is its correction for the delay and attenuation distortions of the associated channel. Then for the three sequential data signals set forth above, the equalized signal $Y_j$ can be expressed as follows:

$$Y_j = C_{-1}(D_{j+2}p_{-1}) + C_{-1}(D_{j+1}p_0) + C_{-1}(D_j p_0) + C_0(D_{j-1}p_1) + C_0(D_{j-1}p_{-1}) + C_0(D_{j-1}p_1) + C_1(D_j p_{-1}) + C_1(D_{j-1}p_0) + C_1(D_{j-2}p_1)$$

Rearranging and combining terms, it can be shown that:

$$Y_j = D_{j+2}(C_{-1}p_{-1}) + D_{j-1}(C_{-1}p_0 + C_0 p_{31\ 1}) + D_j(C_{-1}p_1 + C_0 p_0 + C_1 p_{-1}) + D_{j-1}(C_0 p_1 + C_1 p_0) + D_{j-2}(C_1 p_1)$$

As previously noted, for good data transmission, the desired equalizer output signal $Y_j$ should contain only the term including the symbol $D_j$. The remaining terms representing the intersymbol interference are preferably reduced to a minimum. This can be accomplished by equating the coefficients of the most significant terms in the previous equation to zero:

$$C_{-1}p_o + C_d p_{-1} = 0$$

and $$C_d p_{-1} + C_{+1}p_0 = 0$$

Since multiplying coefficient $C_0$ and sample value $p_0$ can be normalized to unity, this results in the following equations:

$$C_{-1} = -p_{-1} \text{ and}$$

(18)

$$C_1 = -p_1$$

In general it can be shown that for an equalizer having $n$ multiplying coefficients, $C_n$ equals $-p_n$ for all values of $n$ except $n = 0$ and $C_n = p_n$ for $n = 0$. This Equation 18 is of primary significance to the timing recovery technique of the present invention.

It will be recalled that it was desirable to monitor the value of a particular $h$ or $p$ sample value at a particular zero crossing in order to control the timing of the sampler 45. However, these $h$ values and $p$ values corresponded to impulse responses and therefore were not actually present in the receiver 21.

Equation 18 is of particular importance to the present invention because the multiplying coefficients $C_1$ and $C_{-1}$ are real values present in the receiver 21 and these values have a very direct relationship to the $p$ sample values of the impulse response $p(t)$. Thus $C_1$ can be monitored to determine the value of $p_1$, and $C_{-1}$ can be monitored to determine the value of $p_{-1}$.

Since ideally all the $p$ values except $p_0$ are equal to zero, the value of any of the multiplying coefficients $C_n$ except $C_0$, could be monitored to determine the $p$ value corresponding to a particular zero crossing. For example, the value of the multiplying coefficients $C_1$, which is equal in magnitude and opposite in sign to the impulse response sample value $p_{+1}$, could be monitored. If the multiplying coefficient $C_{+1}$ tended to be positive, this would correspond to a negative $p_{+1}$ value and would therefore be indicative of retarded timing. If $C_{+1}$ varies negatively, this would correspond to a positive $p_{+1}$ value and would therefore be indicative of advanced timing.

Similarly, the multiplier having a coefficient $C_{-1}$, which is equal in magnitude and opposite in sign to the impulse response sample value $p_{-1}$, could be monitored. If the multiplying coefficient $C_{-1}$ tended to be positive, this would correspond to a negative $p_{-1}$ value and would therefore be indicative of advanced timing. If $C_{-1}$ tended to be negative, this would correspond to a positive $p_{-1}$ value and would therefore be indicative of retarded timing.

With reference to FIG. 7E, it can be appreciated that the monitoring of the multiplying coefficient $C_{+1}$ is more advantageous in controlling timing than the monitoring of any of the other multiplying coefficients. The point 221 corresponds to the zero crossing of a leading edge 215 of the impulse response $p(t)'$. This point 221 might also correspond to the particular $p$ sample value which is designated $p_{-1}$. Similarly, the zero crossings corresponding to the $p$ sample values $p_{-3}$ and $p_{-4}$ are designated consecutively by the reference numerals 223 and 225. On a trailing edge 217 of the impulse response $p(t)'$, a point 219 corresponds to the $p$ value $p_{-1}$. Similarly, the $p$ values $p_{+3}$ and $p_{+5}$ are designated by the numerals 227 and 229.

It will now be noted that the slope of the impulse response $p(t)'$ at each of the zero crossing designated is rather gradual, except at the point 219. It follows that variations in timing from the zero crossing at the point 219 would provide corresponding $p_{+1}$ values of significant magnitude, whereas variations in timing at any of the other zero crossings would provide corresponding $p$ values of lesser magnitude.

It follows that by monitoring the zero crossing on the trailing edge 219 of the impulse response $p(t)'$ a significant indication is provided if samples are either advanced or retarded from the zero crossing. Thus by monitoring the multiplying coefficient corresponding to $p_{+1}$, the timing of the sampler 45 can be controlled accordingly.

The particular multiplying coefficient corresponding to $p_{+1}$ is that coefficient which is associated with the equalization multiplier immediately following the primary multiplier having the multiplying coefficient $C_0$. For example, in a preferred embodiment, a particular equalizer such as the equalizer 106 may include a series of ten multipliers each having its own multiplying coefficient. In this particular embodiment, the primary multiplier may be the fourth multiplier in the series in which case the fifth multiplier in the series would have the value corresponding to $p_{+1}$ at the point 219 in FIG. 7E.

Whereas the monitoring of the coefficient $C_{+1}$ is thought to be particularly advantageous for controlling timing, any of the coefficients corresponding to a $p(t)'$ zero crossing could be monitored. It will be noted however that at the points 221, 225 and 227 where the impulse response $p(t)'$ approaches the zero level from a negative direction, advanced timing corresponds to a negative $p$ value. At the points 223, 219 and 229 however, the impulse response approaches the zero crossing from a positive value so that advanced timing corresponds to the positive $p$ value.

The timing of the sampler 45 is particularly critical. If the samples of the incoming signal are not taken at the data rate of the transmitter 13, such as 4800 times per second, the detected data forwarded to the data processing apparatus 23 may not correspond to that initiated by the data processing apparatus 11.

It has already been shown that timing can be controlled by monitoring the sign of the multiplying coefficient $CI_{+1}$ in any of the equalizers designated in FIG. 5 by consecutively even numerals of either 100 or 106. For example, in the equalier 106 which includes a primary tap 155 and a tap 157 following the primary tap 155, the multiplying coefficient $CI_{+1}$ of the tap 156 can be monitored. A conductor 159 couples the tap 157 to a timing control network 161. The timing control network 161 is responsive to the characteristics of the tap 157 to control the rate at which the sampler 45 samples the incoming signal. In a preferred embodiment the timing control network 166 is responsive to the sign of the multiplying coefficient $C_{+1}$ of the tap 157 to advance the sampling of the sampler 45 if the sign is positive and retard the sampling of the sampler 45 if the sign is negative.

The timing control network 161 can be of the type illustrated in FIG. 6. In this network 161, the conductor 159 is introduced to a level detector 163. It is the purpose of the level detector 163 to compare the signal on the conductor 159 against some reference level to provide a first digital indication if the signal is greater than the reference level and to provide a second digital indication if the reference level is greater than the signal. To accomplish this function, the level detector 163 may include apparatus for subtracting the reference level from the signal on the conductor 159. If the difference is positive, the detector 163 provides the first digital indication; and if the difference is negative, the detector 163 will provide the second digital indication.

In a preferred embodiment, the level detector 163 includes a comparator 165. In this embodiment, the comparator 165 compares the signal on the conductor 159 against a reference level of zero. The detector 163 provides the first digital indication if the signal on the conductor 159 is positive and provides the second digital indication if the signal on the conductor 159 is negative. This embodiment is preferred since no elaborate subtracting apparatus is used. Furthermore, only the first digit, the sign digit, of the multiplying coefficient $C_{+1}$ need be monitored.

In the preferred embodiment, a clock 183 having a high frequency such as 4.8 megacycles is connected to a baud rate generator counter 185. The counter 185 is provided to count a particular number of the pulses from the clock 183, the particular number corresponding to a given time interval. For example, the particular number may be 1000 so that, in a time interval of 1/4800 second, the counter 185 will count 1000 pulses having a frequency of 4.8 megacycles.

The counter 185 can be connected to the sampler 45 so that the interval of time over which the 1000 pulses are counted can control the sampling rate of the sampler 45. The timing control network 161 can be provided with means to increase or decrease the number of counts of the counter 185 so that the timing rate of the sampler 45 will be decreased or increased, respectively. This means can include a timing rate adjustment control 187 which can be adapted to receive the signal from the level detector 163 and to introduce this signal to an add or delete pulse circuit 189. The timing rate adjustment control 187 preferably includes a gate 189 which can be closed to introduce the signal from the detector 163 to the add or delete pulse circuit 189. An adjustment rate counter 191, which preferably is responsive to the output of the counter 185, can be connected to the adjustment control 187 to control the interval over which the gate 189 is opened. It is desirable that this interval be greater than one baud to enable the system to adjust to timing corrections. For example, in the preferred embodiment, this interval of time is equal to 16 bauds.

In the preferred embodiment, the output of the pulse circuit 189 is connected to the counter 185. In response to the receipt of the first digital indication from the detector 163, the pulse circuit 189 will add an additional pulse to those counted by the counter 185 so that the duration over which the particular number of pulses is counted, is shortened. This will result in advancing the timing of the sampler 45. Similarly, upon receipt of a negative sign from the integrator 181, the pulse circuit 189 will delete a pulse from those counted by the counter 185 so that the timing of the sampler 45 is retarded.

The ratio between the frequency of the clock 183 and the particular count made by the counter 185 determines the amount of increase or decrease in the timing rate. Thus, where the frequency of the clock 183 is 4.8 megacycles and the particular count of the counter 185 is 1000 pulses, the deletion or addition of a single pulse by the pulse circuit 189 results in an advancement or retardation, respectively, of the timing rate by 1/4800 of a baud.

With this implementation, the timing of the receiver 21 can be controlled without the generation of special timing error terms. It is the relationship between the $p$ values and the multiplying coefficients of the equalization network 57 which is of particular importance. Since certain of the multiplying coefficients have a known relationship to particular $p$ values in the $p(t)'$ signal, the multiplying coefficients can be monitored to determine the particular $p$ value. Additionally, since the timing in the receiver 21 has a known relationship with respect to the particular $p$ values, the multiplying coefficients provide an excellent indication of timing. Furthermore, the particular coeffecient $C_{+1}$, corresponding to the zero crossing at the point 219 (FIG. 7E), can be monitored so that variations in the timing can provide significant indications of timing error.

Proceeding with a discussion of the phase correction network 59, it will be noted that if the (1,1) partial response signaling is perfect, and there is no channel distortion, the signals at the input to the phase correction network 59 can be expressed as follows:

$$YI_j = DI\, l_o \cos\phi + DQ\, l_o \sin\phi \qquad (19)$$

$$YQ_j = DQ\, l_o \cos\phi - DQ\, l_o \sin\phi$$

where

*DI* and *DQ* are the signal outputs of the detectors 61 and 63, $I_o$ is the first sampled value of the impulse response, and $\phi$ is an angle which results from the undesirable phase and frequency offsets and phase jitter.

In order to achieve the desired result wherein YI and YQ equal DI$I_o$ and DQ $I_o$, respectively, it is generally desirable that the phase correction network 59 remove the sin$\phi$ and cos$\phi$ terms from Equation 19. This can be accomplished by a phase lock loop such as that illustrated in FIG. 8. The phase lock loop includes the phase correction network 59, the detectors 61 and 63 in the respective I and Q channels, the error calculator 65, and a filter 140 connected between the error calculator 65 and the phase correction network 59.

The phase correction network 59 includes four multipliers 109, 111, 113, and 115. In the multipliers 109 and 111, the signal YI' provides the multiplicand, and in the multipliers 113 and 115, the signal YQ' provides the multiplicand. A sine/consine ROM 117 ideally provides output signal for the sine of some variable angle $-\phi'$ and the cosine of the angle $-\phi'$, which are equivalent to $-\sin\phi'$ and $+\cos\phi'$, respectively. The cos $\phi'$ signal is introduced to the multipliers 109 and 115 to multiply the respective multiplicands therein. Similarly, the $-\sin\phi'$ signal is introduced to the multipliers 111 and 113 to multiply the multiplicands therein. An adder 119 is connected to add the products from the multipliers 109 and 113, and a differential adder 121 is connected to the multipliers 111 and 115 to provide a difference in their products. It follows that the signals from the adders 119 and 121, which are introduced to the in-phase and quadrature channels respectively, can be expressed as follows:

$$YI_j = YI'_j \cos\phi' - YQ'_j \sin\phi'$$
$$YQ_j = YQ'_j \cos\phi' + YI'_j \sin\phi'$$
(Previously designated Equation 7)

Now, if the angle $\phi'$ of the ROM 117 is equal to the angle $\phi$ resulting from the phase jitter and offset, a substitution of Equation (19) into Equation (7) will show that YI = DI $I_o$ and YQ = DQ $I_o$. This, of course, is the desired result.

From the foregoing analysis, it is apparent that, if the sine/cosine ROM 117 is providing sine and cosine values of an angle $\phi'$ equal to the angle $\phi$, the desired data can be detected. Although this is the ideal situation, in practice the angle $\phi'$ of the ROM 117 may differ slightly from the angle $\phi$. For this reason, it is particularly desirable that the angle $\phi'$ of the sine/cosine ROM 117 be updated in order to compensate for variations in the phase error. It is also of importance that this phase angle correction be made as rapidly as possible so that the system can track rapid changes in the phase. To accomplish this purpose, a phase lock loop including the phase correction network 59 and the error calculator 65 is provided to update the angle $\phi'$ of the ROM 117.

One of the functions of the error calculator 65 of FIG. 4 is to generate a particular error signal $E_{PLL}$ for the phase lock loop. Thus, the error signal calculator 65 can be provided with a comparator 123 having one input terminal connected to ground 125 and another input terminal connected to receiver the signal YI. The comparator 123 is adapted to determine the sign of the signal YI and to introduce this sign to a multiplier 127. A comparator 129, which is similarly connected to the reference potential 125, is adapted to receive the signal YQ and to introduce the sign of the signal YQ to a multiplier 131.

The EI signal on the terminal 70 can be introduced to the multiplier 131, and the EQ signal on the terminal 72 can be introduced to the multiplier 127. The product provided by the multiplier 131 can be introduced to the positive terminal of a differential adder 137, and the produce from the multiplier 127 can be introduced to the negative terminal of the adder 137. The output of the adder 137 can then be expressed as the quantity EI SGN(YQ) − EQ SGN(YI). In the preferred embodiment, this quantity is introduced to a network 139 wherein it is multiplied by a variable gain control having a transfer function K, which is derived from the DI and DQ signals of the detectors 61 and 63. The function K can be expressed as follows:

$$K = \frac{1}{|DI| + |DQ|} \qquad (20)$$

The particular value of K will depend upon the absolute values of DI and DQ which in turn depend upon the particular encoding operation used in the system. For example, an encoded data sample DI may be provided by combining the value of the present data sample dI with the value of the preceding data sample $dI_{-1}$. It follows that if the data sample *dI* have 2 values, such as +1 and −1, the encoded data sample DI can have 3 values, such as +2, 0, and −2. This is commonly referred to as 2/3 operation which can be tabulated as follows:

| 2/3 Operation | | |
|---|---|---|
| dI | $dI_{-1}$ | DI |
| +1 | +1 | +2 |
| +1 | −1 | 0 |
| −1 | +1 | 0 |
| −1 | −1 | −2 |

Another type of operation is used in the preferred embodiment wherein the data sample dI can have 4 values, such as +3, +1, −1, and −3, so that the encoded data samples DI can have 7 values. This 4/7 operation is tabulated below.

| 4/7 Operation | | |
|---|---|---|
| dI | $dI_{-1}$ | DI |
| +3 | +3 | 6 |
| +3 | +1 | 4 |
| +3 | −1 | 2 |
| +3 | −3 | 0 |
| +1 | +3 | 4 |
| +1 | +1 | 2 |
| +1 | −1 | 0 |
| +1 | −3 | −2 |
| −1 | +3 | 2 |
| −1 | +1 | 0 |
| −1 | −1 | −2 |
| −1 | −3 | −4 |
| −3 | +3 | 0 |
| −3 | +1 | −2 |
| −3 | −1 | −4 |
| −3 | −3 | −6 |

Values for DQ can be similarly derived from the corresponding levels of the data samples dQ. Finally, the particular values of K can be determined by substituting the values of DI and DQ into Equation 14. In the foregoing manner, the output of the adder 137 is multiplied by this transfer function K in the network 139 to provide the following error signal $E_{PLL}$ for the phase lock loop:

$$E_{PLL} = \frac{EI\ SGN(YQ) - EQ\ SGN(YI)}{|DI| + |DQ|} \quad (21)$$

In a double sideband system which is not quadrature modulated, the error signal ($E_{PLL}$) for the phase lock loop can be expressed as follows:

$$E_{PLL} = \frac{EQ\ SGN\ YI}{|DI|}$$

This particular signal can be implemented in a manner similar to that disclosed for deriving Equation 21. To accommodate single sideband transmissions, modifications of the signal $E_{PLL}$ can be made to eliminate cross channel terms.

It will now be shown that for small angles of $\phi$, and $\phi'$ Equation 21 provides a phase lock loop error signal $E_{PLL}$ which is equal to $\phi - \phi'$ or $\Delta\phi$. Substituting Equation 19 into Equation 7 and then substituting Equation 7 into Equation 8, this error signal EI can be expressed as follows:

$$EI = [DIl_o \cos\phi + DQl_o \sin\phi] \cos\phi' - [DQl_o \cos\phi - DIl_o \sin\phi] \sin\phi' - DI\hat{l}_o$$

which can be rearranged by virtue of trigonometric identities as $$EI = DIl_o \cos(\phi-\phi') + DQl_o \sin(\phi-\phi') - DI\hat{l}_o$$

with $$\Delta\phi = \phi-\phi'\ \text{small},\ \cos(\phi-\phi') = 1,\ \sin(\phi-\phi') = \phi-\phi' = \Delta\phi$$

$$EI = DI(l_o - \hat{l}_o) + DQl_o \Delta\phi \quad (22)$$

The first term in Equation 22 is corrected by decision threshold learning. The second term in Equation 22 remains uncorrected, so as far as the phase lock loop is concerned, $$EI = DQl_o \Delta\phi$$

By a similar deviation it can be shown that $$EQ = -DQl_o \Delta\phi$$

It follows that the quantities in the numerator of Equation (15) can also be expressed as follows since the signs of YI and YQ will be the same as the signs of DI and DQ, respectively:

$$EI\ SGN(YQ) = |DQ|l_o \Delta\phi \quad (23)$$

$$EQ\ SGN(YI) = |DI|l_o \Delta\phi$$

Substituting Equation (23) into Equation (21), it is apparent that $E_{PLL}$ equals $l_o \Delta\phi$. For $l_o$ normalized to 1, it follows that $E_{PLL}$ becomes $\Delta\phi$ radians as predicted.

The phase lock loop is shown in greater detail in FIG. 8. In addition to the phase correction network 59 and the error calculator 65, the phase lock loop includes the detectors 61 and 63, and the filter 140 which can be connected between the error calculator 65 and the ROM 117 in the network 59. In response to the error signal $E_{PLL}'$ the filter 140 provides means for updating the angle $\phi'$ of the sine/cosine ROM 117. To accomplish this purpose, the filter 140 may include a first-order branch and a second order branch, shown generally at 141 and 142, respectively. The error signal, $E_{PLL}'$ is preferably introduced to a limiter 143 in the first-order branch 141. The limiter 143 can be set to pass only phase angle differentials $\Delta\phi$ within a range of 3 degrees to control the rate of phase correction. The same differential $\Delta\phi$ can then be introduced also to an integrator shown generally at 145.

The second-branch of the filter 140 can include a cumulative adder 147 functioning as an integrator 147. The adder 147 is preferably disposed to receive the error signal $E_{PLL}$ on one of its input terminals. Another of the input terminals of the adder 147 is connected to the output of the adder 147 through a delay 148. In the preferred embodiment, the output of the adder 147 is also connected to a digital multiplier 149 which provides means for adjusting the gain G of the phase lock loop. The amplified signal can then be introduced through a limiter 151 to the integrator 145. In the preferred embodiment, the limiter 151 is set to pass only degree differentials within the range of ±1°. Thus, the limiters 143 and 151 insure that the phase lock loop does not overcompensate for apparently large fluctuations in the error signal $E_{PLL}$.

The amplifier 149 is desirable to establish the bandwidth of the phase lock loop. Although it is apparent that an amplifier can be provided in each of the branches 141 and 142, it is the relative magnitude of the gains in the branches 141 and 142 which is of primary concern. For this reason, in the preferred embodiment the amplifier in the branch 141 is normalized to one or omitted and the amplifier 149 in the branch 142 is provided with a gain of 0.01.

As previously noted, the phase offset is characterized by a difference in the carrier phase of the transmitter 13 and receiver 21. This condition can be overcome in the initial correction of the phase lock loop. Then when $\phi'$ is substantially equal to $\phi$, the remaining corrections are those responsive to the continuously varying phase caused by either frequency offset or phase jitter.

The frequency offset of the incoming signal varies the phase angle $\phi$ in a linear manner with time while the phase jitter of the incoming signal varies the phase angle $\phi$ in a nonlinear, generally sinusoidal, manner with time. The integrator 147 is responsive to the linear changes of the phase differential $\Delta\phi$, so that the second-order branch 142 compensates for the frequency offset of the received signal. However, the first-order branch 141 is responsive to the nonlinear fluctuations of the phase angle $\Delta\phi$ so that the first-order branch 141 compensates for the phase jitter and the phase offset of the received signal.

The output of the integrator 145, which provides the angle $\phi'$ to the ROM 117 is provided with a feedback loop 153 so that the inputs to the integrator 145 include not only the updating information from the first and second order branches 141 and 142, but also the previous angle $\phi'$. In this manner, the angle $\phi'$ of the ROM 117 is maintained substantially at the angle $\phi$ so that the undesirable phase terms in the equalized signals YI' and YQ' can be substantially eliminated by the phase correction network 59.

By way of example, it will be noted that if the phase angle $\phi$ is 50° and the phase angle $\phi'$, as calculated in the preceding baud interval is 49°, $E_{PLL}$ will equal $\Delta\phi$ or +1°. Since this differential is within the preferred range of the limiter 143, the quantity will be passed to the integrator 145. In the integrator 145, the differential angle of +1 degree will be added to the previous angle $\phi'$ so that the updated $\phi'$ is equal to 50°. In this manner, the angle $\phi'$ of the sine/cosine ROM 117 can be made equivalent to the angle $\phi$ in the YI' and YQ' signals. Since the corrections provided by the second-branch 142 are dependent on the prior history of the signal $E_{PLL}'$ they were not considered in this elementary example.

It is of particular interest that the branches 141 and 142 receive the same input signal, $E_{PLL}'$ and each provide an input to the integrator 145. This enables the integrator 145 to provide a single output signal $\phi'$ for use by a single phase correction network 59. It is also of interest that those elements of the receiver, which have insignificant delay characteristics, are excluded from the phase lock loop. More specifically, it will be noted that the entire phase lock loop follows the lowpass filters 53 and 55 and the equilization network 57. This enables a phase error to be calculated by the error calculator 65 and the signal $\phi'$ provided by the filter 140 in the period of a single baud interval.

Although described with primary reference to a quadrature amplitude modulated system using (1,1) partial response signaling, it has already been shown that the phase lock loop is also applicable to other pulse amplitude modulated systems. Furthermore, this phase lock loop can be used with other types of partial response signaling. More specifically, any partial response signals DI, DQ which are derived from the data signals DI, dQ can be used to calculate the phase error.

As illustrated in FIG. 3, the YI and YQ signals from the phase correction network 59 can be introduced into the detectors 61 and 63 wherein the partial response signals DI and DQ are respectively detected. The decision threshold control 77 can be connected between the equalization control network 69 and the detectors 61 and 63 to automatically adjust the decision threshold value $l_o$ for both the in-phase and quadrature channels 49 and 51, respectively. This operation of the decision threshold channel 77 is desirable for proper system operation to counteract for variations in signal level.

It will be recalled, with reference to Equation 8, that the EI and EQ can be expressed as:

$$EI = YI - DI\,\hat{l}_o$$

$$EQ = YQ - DQ\,\hat{l}_o$$

where, as previously discussed, $\hat{l}_o$ is the estimate of $l_o$ derived by the decision threshold control 77. Substituting DI $l_o$ and DQ $l_o$ for YI and YQ, respectively, and combining terms, Equation (8) becomes $$EI = DI\,(l_o - \hat{l}_o)$$
$$EQ = DQ\,(l_o - \hat{l}_o) \tag{24}$$

If the signals of both the I and Q channel error signals of Equation (25) are extracted and multiplied by the signs of both the I and Q channel detected signals DI and DQ, respectively, then the terms $E_1(n)$ and $E_2(n)$ of Equation (17) for the special case of $n$ equal to zero are formed by the equalization control network 69. Then it is obvious that $E_1(o)$ and $E_2(o)$ become independently, $$E_1(o) = E_2(o) = SGN\,(l_o - \hat{l}_o) \tag{25}$$

Since independent equations are formed, both may be used in the decision threshold contact 77 to provide information for updating the value of $\hat{l}_o$.

A typical control 77 might be of the type illustrated in FIG. 9 to include an integrator control network 195 connected to receive from the equalization control network 69 the error signals $E_1(o)$ and $E_2(o)$. The integrator 197 includes a delay 199 which provides the estimate of $l_o$ previously designated $\hat{l}_o$.

Referring again to Equation (25), it is obvious that if $(l_o - \hat{l}_o)$ is positive, $\hat{l}_o$ is too small. This condition can be sensed by the integrator control network 195 so that the integrator 197 is incremented to raise the value of $\hat{l}_o$. Conversely, in response to a negative $(l_o - \hat{l}_o)$, the integrator control network 195 can decrement the integrator 197 to lower the value of $\hat{l}_o$. Other possible values of $E_1(o)$ and $E_2(o)$ can be treated in accordance with the following table to step the integrator 197.

| | | Integrator Control Network | |
|---|---|---|---|
| $E_1(o)$ | $E_2(o)$ | Increment Steps | Decrement Steps |
| + | + | 2 | |
| + | 0 | 1 | |
| + | − | | |
| 0 | + | 1 | |
| 0 | 0 | | |
| 0 | − | | 1 |
| − | + | | |
| − | 0 | | 1 |
| − | − | | 2 | where $E_1(o)$ and $E_2(o)$ are $E_1(n)$ and $E_2(n)$, respectively, of Equation (17) for the particular case of $n$ equal to zero.

From the output of the integrator 97, the estimate $\hat{l}_o$ can be introduced to a decision reference multiplier 201 to provide the reference quantities $\pm\hat{l}_o$ for 2400 bps operation and the additional reference quantities $\pm 3\,\hat{l}_o$ and $\pm 5\,\hat{l}_o$ for 4800 bps operation. These reference quantities can be introduced to the detectors 61 and 63 on the conductor 203. In the detectors 61 and 63, these reference quantities can be used as limits within which a particular YI or YQ signal level will be detected as one of the 3 levels in ⅔ operation or one of the 7 levels in 4/7 operation. For example, in ⅔ operation, if the particular YI signals are as indicated in the following table, the corresponding values of DI will be detected.

| Signal | 2/3 Operation Detection (DI) |
|---|---|
| $\hat{l}_o \leq YI$ | 2 |
| $-\hat{l}_o < YI < \hat{l}_o$ | 0 |
| $YI \leq -\hat{l}_o$ | −2 |

In the 4/7 mode of operation, the decision reference multiplier 201 provides levels of 5 $\hat{l}_o$, 3 $\hat{l}_o$, $\hat{l}_o$, $-\hat{l}_o$, $-3\hat{l}_o$, and $-5\hat{l}_o$ for the detection of the partial response signals as shown below:

| Signal | 4/7 Operation Detection (DI) |
|---|---|
| $5 \hat{I}_o \leq YI$ | 6 |
| $3 \hat{I}_o \leq YI < 5 \hat{I}_o$ | 4 |
| $\hat{I}_o \leq YI < 3 \hat{I}_o$ | 2 |
| $-\hat{I}_o \leq YI < \hat{I}_o$ | 0 |
| $-3 \hat{I}_o \leq YI < -\hat{I}_o$ | $-2$ |
| $-5 \hat{I}_o \leq YI < -3 \hat{I}_o$ | $-4$ |
| $YI < -5 \hat{I}_o$ | $-6$ |

In a similar manner, the detector 63 provides the symbols DQ from the signal YQ in response to threshold values provided by the decision threshold control 77.

The preferred embodiments of the invention hereinabove described are of particular advantage in transmitting data over existing telephone lines. With the provision of (1,1) partial response signaling at 1200 symbols per second, the modem of this invention can transmit data at a rate of 4800 bps with a baseband of only 600 Hertz, or 1200 Hertz in double sideband. For example, if the carrier of the transmitter 13 has a frequency of 1600 Hertz, the primary data channel will occupy the spectrum between 1000 Hertz and 2200 Hertz. Since this is the best part of the telephone line spectrum the telephone line can be easily equalized for satisfactory operation. Furthermore, this preferred spectrum does not vary greatly from line to line so that the modem can operate effectively over a very high percentage of the existing telephone lines. In most telephone lines, a primary data channel between 1000 and 1200 Hertz leaves sufficient spectrum for the transmission of a 150 bps frequency shift modulated simplex channel on each side of the primary data channel. In the present invention, the primary channel occupies the spectrum between 1000 Hertz and 2200 Hertz.

The equalization network 57 previously described is particularly adapted for use with a system having partial response signaling. It uses the detected data signals which are already available, thereby saving on the circuitry which might otherwise be used to determine and store the sign of the unequalized signal. It also uses a majority vote of both the in-phase and quadrature signals to enhance the accuracy of the equalization adjustment and the speed of equalization convergence.

The equalization network 57 compensates for the delay and attenuation distortions typically caused by the telephone transmission line 17. In response to the error signals EI and EQ, the multipliers of the equalizers 100, 102, 104, and 106 are automatically updated to correct for changes in the line characteristics. The transmitted signal need not be predistorted, and manual adjustments to the receiver are not required. It is also of significant advantage that the equalization network 57 corrects for intersymbol interference which leads as well as follows the signaling pulse. Furthermore, the network 57 is particularly adapted for use with a quadrature double sideband receiver which is itself highly desirable for the reasons set forth previously.

Of particular importance to the present invention is the fact that the equalization network 57 provides signals within the receiver 21 which have known relationships with the magnitude of signals at various zero crossings within the impulse response signals $p(t)'$. Thus these signals from the network 57 can be monitored to determine whether the sampling of the sampler 45 is accurate. By monitoring the first tap, such as the tap 157, following the primary tap, a signal of significant magnitude provides an indication of timing error.

In the present phase correction network 59, the phase lock loop does not include any delaying devices, such as the lowpass filters 53 and 55, so that transport delay is minimized. This enables the phase correction network 59 to be responsive to fast phase jitter so that even small deviations in phase error can be corrected without overcompensation.

It is particularly important that the incoming data provides updating information for not only equalization and phase correction, but also for timing. No pilot tone need be transmitted to provide a reference for error calculation. Furthermore, the error signals EI and EQ can be used for updating each of the networks to thereby conserve on the circuitry of the system.

Although the invention has been described with reference to particular embodiments, it will be obvious to those skilled in the art that the invention can be otherwise embodied. For this reason, the scope of the invention should be ascertained only with reference to the following claims.

We claim:

1. An apparatus for removing at least some of the distortion from an analog signal, said apparatus comprising:
   means for sampling the analog signal to provide a first signal having a digital format;
   equalizer means responsive to the first signal to provide a substantially equalized signal;
   said equalizer means including a plurality of multipliers, each of said multipliers having an associated multiplying coefficient and being capable of multiplying the first signal by such multiplying coefficient;
   means for controlling the values of at least some of said multiplying coefficients which are employed by said multipliers;
   timing control means responsive solely to the multiplying coefficient of at least one of said multipliers for adjusting said sampling means;
   means other than said multipliers for providing a phase error signal; and
   phase correction means responsive to the phase error signal for substantially correcting the phase of the equalized signal.

2. An apparatus as defined in claim 1 wherein said multiplying coefficient of said at least one multiplier can vary between positive and negative values and said timing control means is responsive to the sign of said multiplying coefficient of said at least one multiplier.

3. An apparatus as defined in claim 1 wherein said multipliers include a primary multiplier having a primary multiplying coefficient normalized to a reference value, said multipliers being in a series and at least some of at least one multiplier including at least one of the multipliers of said series adjacent to said primary multiplier.

4. An apparatus as defined in claim 1 wherein the timing control means is responsive solely to the multiplying coefficient of only one of said multipliers for adjusting the sampling means.

5. An apparatus as defined in claim 1 wherein said apparatus includes first and second channels adapted to have first and second components, respectively, of the equalized signal therein.

6. An apparatus as defined in claim 1 wherein said first signal includes a plurality of samples with adjacent samples being separated by a first interval of time and said timing control means controls the duration of the first interval of time.

7. An apparatus for removing at least some of the distortion from an analog signal, said apparatus comprising:
  means for sampling the analog signal to provide a data signal having a digital format;
  an equalizer having a data signal path for the transmission of data through the equalizer and first means responsive to the data signal for providing a substantially equalized data signal at the output of the data signal path;
  said first means including a plurality of multiplier means each of which is capable of multiplying the data signal by an associated multiplying coefficient;
  means for varying the values of at least some of said multiplying coefficients;
  a timing control network;
  means for coupling the timing control network to at least one of the multiplier means through a timing signal path, said timing signal path being different from said data signal path,
  said timing control network including means for monitoring through said timing signal path a characteristic of the multiplying coefficient of said at least one multiplier means and means responsive to said characteristic for adjusting the sampling means; and
  phase correction means for substantially correcting the phase of at least one of the data signal and the equalized data signal substantially independently of the multiplying coefficients.

8. An apparatus as defined in claim 7 wherein the multiplying coefficient of said at least one multiplier means can vary between positive and negative values and said characteristic includes the sign of the multiplying coefficient of said at least one multiplier means.

9. An apparatus adapted to receive a distorted analog signal comprising:
  first means for sampling the analog signal to provide a plurality of samples with adjacent samples being separated by a first interval of time, the samples being expressed in a digital format to form a distorted digital data signal;
  equalizer means including a plurality of taps, each of the taps having a multiplying coefficient with characteristics for substantially equalizing the distorted digital signal to provide a substantially equalized signal;
  second means responsive to the characteristics of the multiplying coefficient of at least one of the taps of the equalizer means to control the duration of the first interval of time; and
  phase correction means for correcting the phase of at least one of the data signal and the equalized signal substantially independently of the multiplying coefficients.

10. An apparatus as defined in claim 9 wherein at least said one tap of the equalizer means provides a timing control signal and wherein said second means includes a clock for providing first pulses at a substantially constant frequency, counter means for counting the first pulses and responsive to a particular number of the first pulses to provide a second pulse, an add-delete pulse circuit responsive to the timing signal having one sign for adding a pulse to those counted by the counter means to increase the time interval between the second pulses and responsive to the timing signal having the other sign for subtracting a pulse from those counted by the counter means to decrease the time interval between the second pulses, switching means operable to introduce the timing signal to the add-delete pulse circuit, and an adjust rate counter means responsive to a particular number of the second pulses provided by the counter means for operating the switching means to introduce the timing signal to the add-delete pulse circuit, the first means being responsive to each of the second pulses to provide one of the samples.

11. An apparatus for removing at least some of the distortion from a modulated analog signal, said apparatus comprising:
  means for sampling the modulated analog signal to provide a first signal having a digital format;
  means for demodulating the modulated signal to provide a demodulated signal and for providing components of the demodulated signal in first and second channels;
  equalizer means responsive to the demodulated signal to provide a substantially equalized signal;
  said equalizer means including a first and second plurality of multipliers in said first and second channels respectively, each of said multipliers having an associated multiplying coefficient and being capable of multiplying at least one of said components by such multiplying coefficient;
  means for controlling the values of at least some of said multiplying coefficients which are employed by said multipliers;
  timing control means responsive solely to the multiplying coefficient of at least one of said multipliers of said first plurality of multipliers for adjusting said sampling means;
  phase correction means responsive to a phase error signal or substantially correcting the phase of the equalized signal a substantially phase corrected signal; and
  means responsive to the substantially phase corrected signal and independent of the multiplying coefficients for providing said phase error signal.

* * * * *

UNITED STATES PATENT OFFICE
CERTIFICATE OF CORRECTION

Patent No. 4,061,978  Dated December 6, 1977

Inventor(s) David M. Motley et al.

It is certified that error appears in the above-identified patent and that said Letters Patent are hereby corrected as shown below:

Column 13, line 35, change the last term of the equation "$pI_{i_I}$" should read -- $pI_{-i_1}$ --.

Column 16, line 25, change the equation to -- $mQ_{-k}=0$ for all k

Column 17, line 6, change "$(EI_{j-1})$" to -- $(EI_{j-n_1})$ -- .

Column 18, lines 25 and 26, change "$MI_{-k}=$" to -- $mI_{-k}=$ -- .

Column 18, lines 27 and 28, delete "$mQ_{-k}=0$ for all k".

Column 19, line 3, change "$P_0$, and $P_{+1}$" to -- $p_0$, and $p_{+1}$ -- .

Column 19, line 21, change the last occurrence of "$p_0$" to -- $p_1$ -- .

Signed and Sealed this

Sixth Day of June 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,061,978            Dated December 6, 1977

Inventor(s) David M. Motley et al.

It is certified that error appears in the above-identified patent and that said Letters Patent are hereby corrected as shown below:

Column 19, line 22, change the first occurrence of "$p_1$" to -- $p_{-1}$ -- and "$(D_{j-1}p_{-1})$" to -- $(D_j p_0)$ -- .

Column 19, line 26, change "$p_{31}$" to -- $p_{-1}$ -- .

Column 19, line 42, change "$p_{-1}$" to -- $p_{+1}$ -- .

Signed and Sealed this

Sixth Day of June 1978

[SEAL]

Attest:

RUTH C. MASON
*Attesting Officer*

DONALD W. BANNER
*Commissioner of Patents and Trademarks*